US008059919B2

(12) United States Patent
Saito

(10) Patent No.: US 8,059,919 B2
(45) Date of Patent: Nov. 15, 2011

(54) IMAGE PROCESSING APPARATUS AND IMAGE PROCESSING METHOD INCLUDING AVERAGING PROCESSING, SCREEN PROCESSING, AND RESOLUTION CONVERTING PROCESSING

(75) Inventor: Daijiro Saito, Tokyo (JP)

(73) Assignee: Konica Minolta Business Technologes, Inc. (JP)

( * ) Notice: Subject to any disclaimer, the term of this patent is extended or adjusted under 35 U.S.C. 154(b) by 1090 days.

(21) Appl. No.: 11/858,528

(22) Filed: Sep. 20, 2007

(65) Prior Publication Data

US 2008/0085063 A1     Apr. 10, 2008

(30) Foreign Application Priority Data

Oct. 4, 2006   (JP) .................................. 2006-273263

(51) Int. Cl.
G06K 9/32      (2006.01)

(52) U.S. Cl. ........ 382/298; 382/254; 382/260; 382/275; 358/1.2; 358/1.9; 358/3.26; 358/451; 358/533

(58) Field of Classification Search .................. None
See application file for complete search history.

(56) References Cited

U.S. PATENT DOCUMENTS

| 5,337,167 | A * | 8/1994 | Hiratsuka et al. ............. 358/533 |
| 5,704,019 | A * | 12/1997 | Akiyama et al. ................ 358/1.1 |
| 6,608,941 | B1 * | 8/2003 | Suzuki et al. ................ 382/272 |
| 7,002,709 | B1 * | 2/2006 | Terada et al. ................ 358/3.28 |
| 2001/0016077 | A1 * | 8/2001 | Oki ............................... 382/240 |
| 2004/0246528 | A1 * | 12/2004 | Washio et al. ................ 358/3.06 |
| 2005/0152005 | A1 * | 7/2005 | Damera-Venkata ......... 358/3.13 |
| 2005/0213120 | A1 * | 9/2005 | Ohkawa et al. ................ 358/1.9 |
| 2005/0259278 | A1 * | 11/2005 | Toura ............................. 358/1.9 |

FOREIGN PATENT DOCUMENTS

| JP | 2001-309183 | 11/2001 |
| JP | 2004-72571 | 3/2004 |
| JP | 2004-364084 | 12/2004 |
| JP | 2006-14262 | 1/2006 |
| JP | 2006-67305 | 3/2006 |

OTHER PUBLICATIONS

Japanese Office Action for Japanese Patent Application No. 2006-273263 mailed Oct. 14, 2008 with English Translation.

* cited by examiner

*Primary Examiner* — Sath V Perungavoor
*Assistant Examiner* — Jason Heidemann
(74) *Attorney, Agent, or Firm* — Cantor Colburn LLP

(57) ABSTRACT

Disclosed is an image processing apparatus, including: an averaging processing unit to periodically execute an averaging processing of applying an averaging pattern to a processing target image and replacing each pixel value in a pixel group corresponding to the averaging pattern with an average value of the pixel values; a resolution converting unit to perform a resolution converting processing to the processing target image, the resolution converting processing converting a resolution R1 of the processing target image into a resolution R2 (R1<R2); a screen processing unit to perform a screen processing to a processed image which has been processed by the averaging processing, the screen processing applying a screen pattern to the processed image at the same or almost the same period as that of the averaging processing; and a control unit to control the averaging processing unit, the resolution converting unit and the screen processing unit such that the averaging processing, the resolution converting processing and the screen processing are performed in this order to the processing target image.

12 Claims, 18 Drawing Sheets

FIG.3
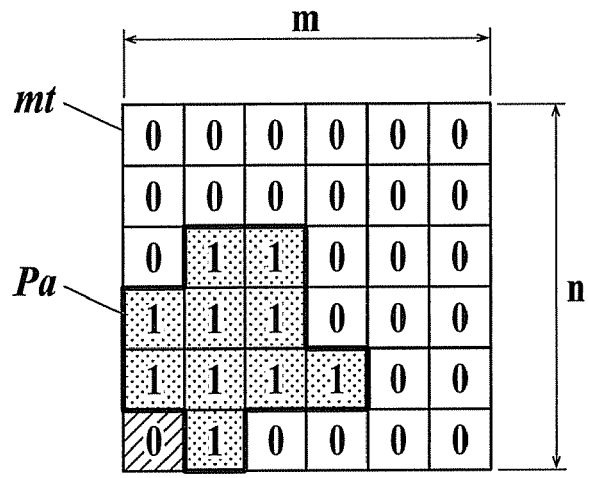
▢ : POSITION OF WATCHING PIXEL
▨ : POSITION OF WATCHING PIXEL
FIG.4
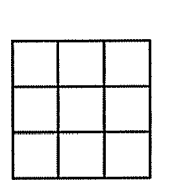
Y
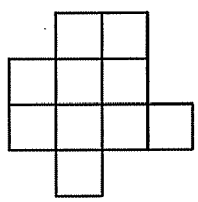
M
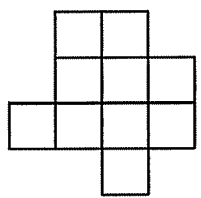
C
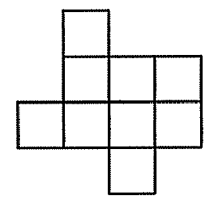
K

FIG.11A
| | | | | | |
|---|---|---|---|---|---|
| 0 | 0 | 0 | 0 | 0 | 0 |
| 0 | 0 | 0 | 0 | 0 | 0 |
| 0 | 0 | 0 | 0 | 1 | 0 |
| 0 | 0 | 1 | 5 | 5 | 0 |
| 0 | 0 | 1 | 5 | 5 | 2 |
| 0 | 0 | 2 | 3 | 0 | 0 |
mt
Pb
▨ : AVERAGING TARGET PIXELS
FIG.11B
| | | | | | | f5 |
|---|---|---|---|---|---|---|
| 75 | 70 | 65 | 65 | 60 | 50 | 45 |
| 61 | 60 | 65 | 65 | 52 | 55 | 30 |
| 65 | 51 | 40 | 45 | 65 | 50 | 25 |
| 45 | 50 | 50 | 51 | 55 | 48 | 31 |
| 55 | 50 | 50 | 35 | 48 | 41 | 30 |
| 40 | 44 | | 44 | 44 | 40 | 25 |
 : EFFECTIVE PIXELS
⇧
| | | | | | | f6 |
|---|---|---|---|---|---|---|
| 75 | 70 | 65 | 65 | 60 | 50 | 45 |
| 61 | 60 | 65 | 65 | 52 | 55 | 30 |
| 65 | 51 | 40 | 225 | 65 | 50 | 25 |
| 90 | 250 | 250 | 255 | 55 | 48 | 31 |
| 165 | 250 | 250 | 88 | 48 | 41 | 30 |
| 40 | | 35 | | 44 | 40 | 25 |
⇧
| | | | | | | f7 |
|---|---|---|---|---|---|---|
| 75 | 70 | 65 | 65 | 60 | 50 | 45 |
| 61 | 60 | 65 | 48 | 52 | 55 | 30 |
| 65 | 48 | 48 | 48 | 65 | 50 | 25 |
| 48 | 48 | 48 | 48 | 55 | 48 | 31 |
| 48 | 48 | 48 | 48 | 48 | 41 | 30 |
| 40 | | 35 | | 44 | 40 | 25 |
 : AVERAGING TARGET PIXELS

FIG.12
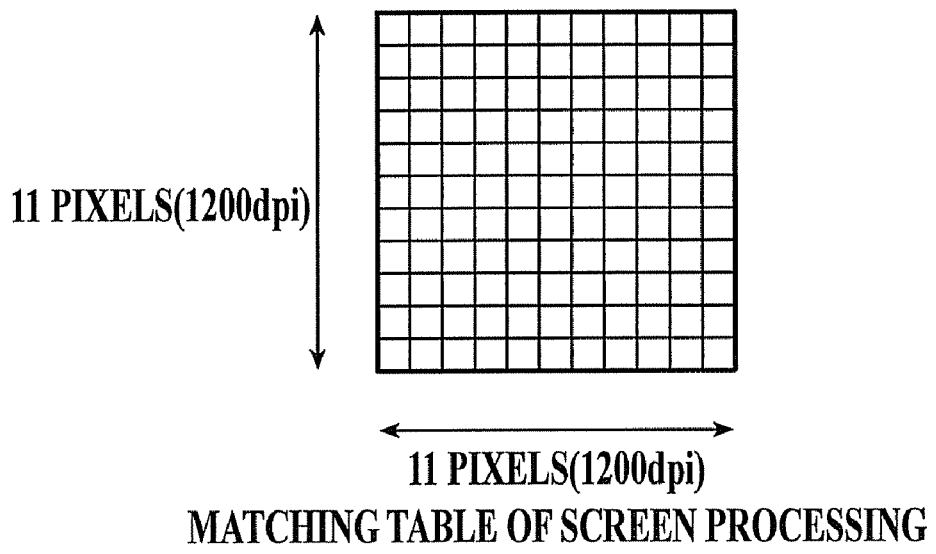
11 PIXELS(1200dpi)
11 PIXELS(1200dpi)
MATCHING TABLE OF SCREEN PROCESSING
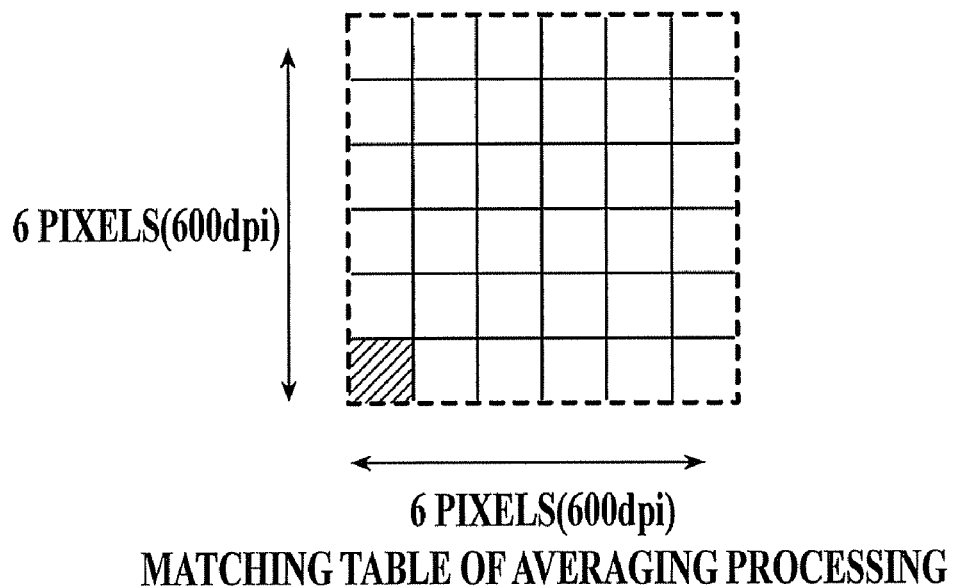
6 PIXELS(600dpi)
6 PIXELS(600dpi)
MATCHING TABLE OF AVERAGING PROCESSING

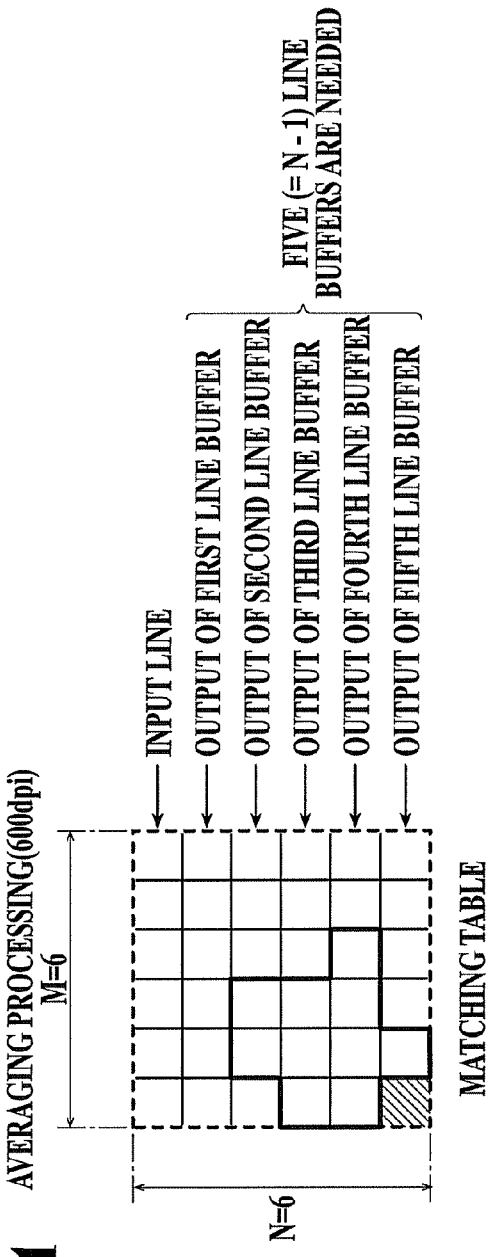
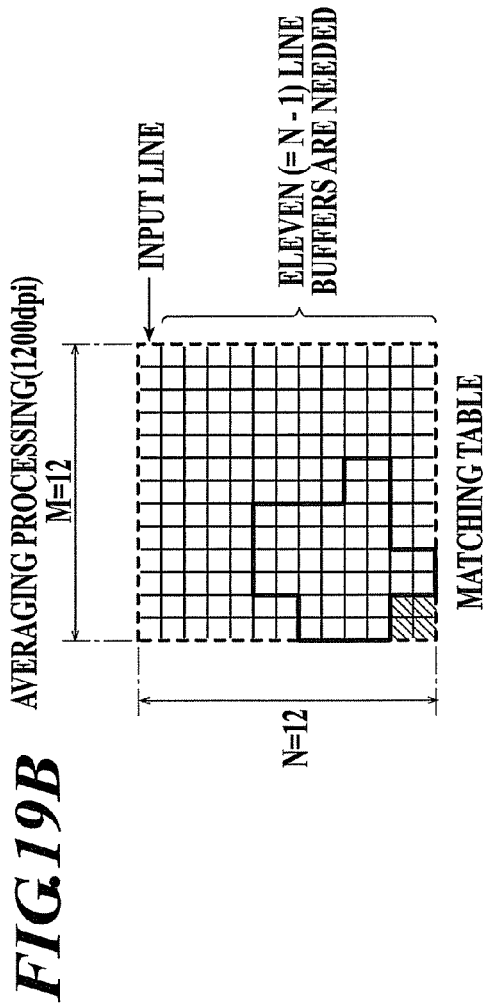
FIG.19A
FIG.19B

IMAGE PROCESSING APPARATUS AND IMAGE PROCESSING METHOD INCLUDING AVERAGING PROCESSING, SCREEN PROCESSING, AND RESOLUTION CONVERTING PROCESSING

BACKGROUND OF THE INVENTION

1. Field of the Invention

The present invention relates to an image processing apparatus and an image processing method that perform averaging processing, screen processing, and resolution converting processing to a target image, which is a processing target.

2. Description of Related Art

If screen processing is performed to an original image in order to express a halftone when the original image is printed (see, for example, Japanese Patent Application Laid-Open Publication No. 2001-309183), a peculiar repetitive pattern called as moiré is sometimes generated in an output image by interference between the period of the halftone dot structure of the original and the period of a pattern applied in the screen processing. In order to prevent the generation of the moiré, it is effective to put the period structure on the original side into disorder, and averaging processing has hitherto been performed for the purpose of putting the period structure into disorder.

However, because the averaging processing averages the detail parts (particulars) of an image together with the period structure of the original image, the averaging processing has a problem of reducing the sharpness of the image. Accordingly, the methods of according the period of the averaging processing with that of the screen processing for holding the sharpness were disclosed (for example, see Japanese Patent Application Laid-Open Publications Nos. 2004-364084 and 2006-14262).

However, it has become possible to heighten the resolution of an output image by the advancement of the printing technique, and the present state of things is that the resolution at the time of outputting is higher than that at the time of reading. An image processing apparatus performs resolution converting processing to an original image after reading to produce an original image having higher resolution and further performs screen processing to the processed original image to produce an output image. At this time, the order of the processing becomes a problem. That is, because the image data quantity to be processed at a subsequent stage increases by the heightened resolution if resolution converting processing is performed at first, a line buffer memory for holding data should have a large capacity. For example, if resolution is converted from 600 dpi to 1,200 dpi, averaging processing is performed using a matching table for 6'6 pixels as shown in FIG. 19A before resolution conversion, and consequently line buffer memories for five lines are sufficient. However, because the size of the matching table becomes 12'12 pixels as shown in FIG. 19B to be twice after resolution conversion, line buffer memories for 11 lines become necessary. This increases the cost and delays processing.

The Japanese Patent Application Laid-Open Publications Nos. 2001-309183, 2004-364084, and 2006-14262 do not disclose any configuration considering the problems owing to the resolution conversion. The image processing apparatus described in the Japanese Patent Application Laid-Open Publication No. 2001-309183 is provided with a plurality of image memories arranged between two pieces of filter processing, but such a configuration expands the circuit size and cannot resolve the heightening of cost accompanying the expansion of the circuit size.

SUMMARY OF THE INVENTION

The present invention aims to provide an image processing apparatus and an image processing method capable of suppressing the expansion of the circuit size owing to averaging processing even when resolution conversion is performed, and capable of synchronizing the averaging processing and screen processing.

According to a first aspect of the present invention, there is provided an image processing apparatus, comprising:

an averaging processing unit to periodically execute an averaging processing of applying an averaging pattern to a processing target image and replacing each pixel value in a pixel group corresponding to the averaging pattern with an average value of the pixel values;

a resolution converting unit to perform a resolution converting processing to the processing target image, the resolution converting processing converting a resolution R1 of the processing target image into a resolution R2 (R1<R2);

a screen processing unit to perform a screen processing to a processed image which has been processed by the averaging processing, the screen processing applying a screen pattern to the processed image at the same or almost the same period as that of the averaging processing; and a control unit to control the averaging processing unit, the resolution converting unit and the screen processing unit such that the averaging processing, the resolution converting processing and the screen processing are performed in this order to the processing target image.

According to a second aspect of the present invention, there is provided an image processing method, comprising the steps of:

periodically executing an averaging processing of applying an averaging pattern to a processing target image and replacing each pixel value in a pixel group corresponding to the averaging pattern with an average value of the pixel values;

performing a resolution converting processing to the processing target image, the resolution converting processing converting a resolution R1 of the processing target image into a resolution R2 (R1<R2);

performing a screen processing to a processed image which has been processed by the averaging processing, the screen processing applying a screen pattern to the processed image at the same or almost the same period as that of the averaging processing; and performing a controlling the averaging processing, the resolution converting processing and the screen processing such that the averaging processing, the resolution converting processing and the screen processing are performed in this order to the processing target image.

BRIEF DESCRIPTION OF THE DRAWINGS

The present invention will become more fully understood from the detailed description given hereinbelow and the appended drawings which are given by way of illustration only, and thus are not intended as a definition of the limits of the present invention, and wherein:

FIG. 3 is a diagram showing an example of a matching table and an averaging pattern;

FIG. 4 is a view showing the example of an averaging pattern set to each color;

FIG. 11A is a diagram showing an example of an averaging pattern in which multiple-valued weighting coefficients are set;

FIG. 11B is a diagram illustrating the averaging in the case of the use of the averaging pattern shown in FIG. 11A;

FIG. 12 is a diagram showing an example in which a matching table has different sizes in averaging processing and in screen processing;

FIG. 19A is a diagram showing line buffer memories necessary in the case where resolution converting processing is performed after averaging processing; and FIG. 19B is a diagram showing line buffer memories necessary in the case where the resolution converting processing is performed before the averaging processing.

DESCRIPTION OF THE PREFERRED EMBODIMENTS

In the following, the embodiment of an image processing apparatus and an image processing method according to the present invention will be described with reference to the attached drawings.

First Embodiment

In a first embodiment, a description is given to an example as follows. That is, image processing is performed in the order of averaging processing, resolution converting processing, and screen processing, and consequently the memory capacity necessary for holding the image data after a resolution conversion is suppressed. The expansion of the circuit configuration pertaining to averaging processing is thereby suppressed.

The configuration is first described.

Figure 1:
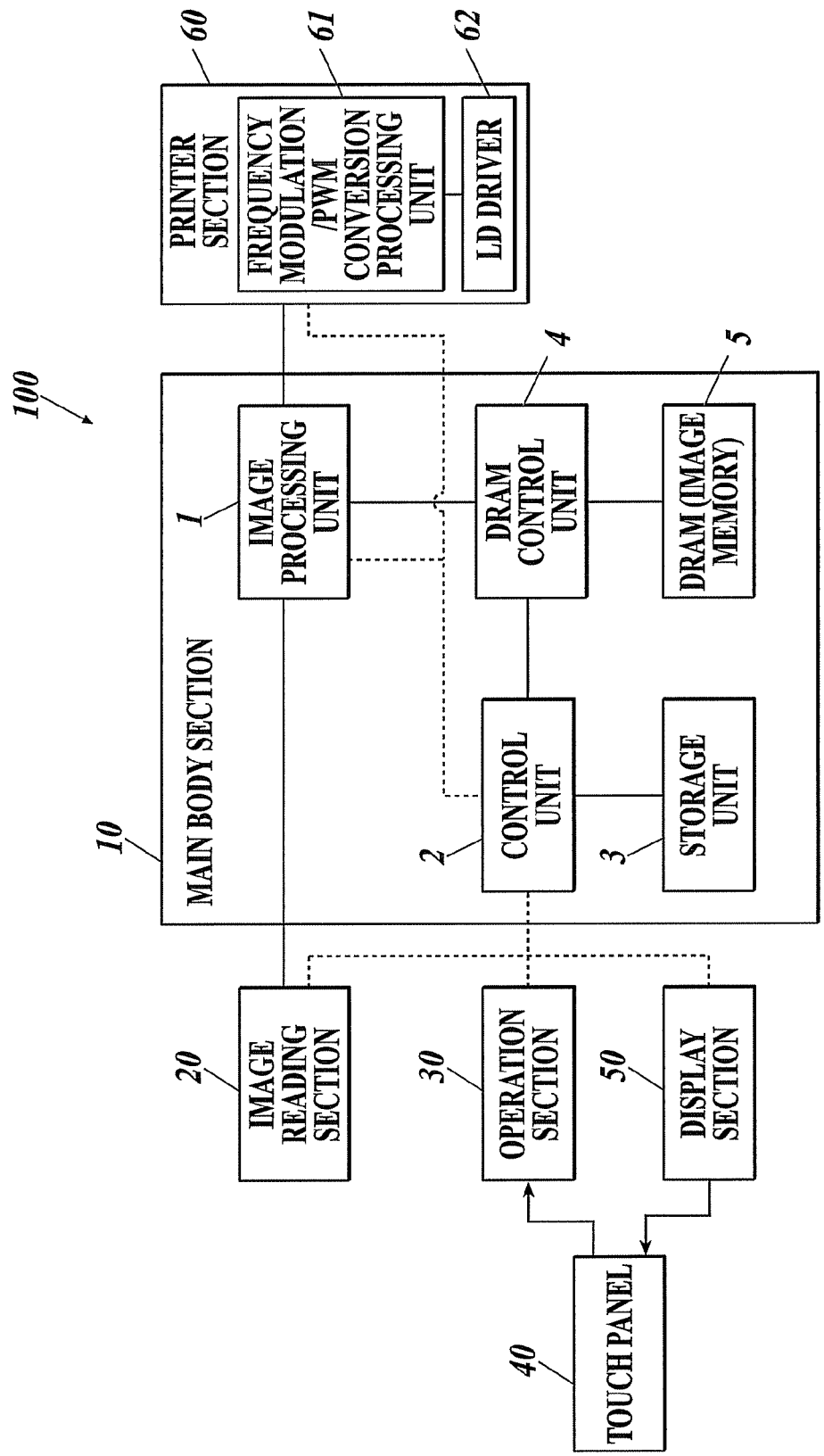
FIG. 1 is a diagram showing the configuration of a multi function peripheral (MFP) in a first embodiment.

FIG. 1 shows a multi function peripheral (MFP) in the present embodiment. The MFP 100 is an image processing apparatus performing image processing to an input image to generate an output image and performing the printing output of the generated output image.

As shown in FIG. 1, the MFP 100 is composed of an image reading section 20, an operation section 30, a touch panel 40, a display section 50, a main body section 10, and a printer section 60. Moreover, the main body section 10 is composed of an image processing unit 1, a control unit 2, a storage unit 3, a dynamic random access memory (DRAM) control unit 4, and a DRAM 5. In the figure, solid lines connecting each of the sections and the units denote system buses, and dotted lines denote serial buses.

The image reading section 20 is equipped with a light source, a charge coupled device (CCD), an A/D converter, and the like. The image reading section 20 illuminates an original with the light emitted from the light source and scans the original with the light. Then, the image reading section 20 focuses the reflected light from the original to form an image on the CCD, which performs the photoelectric conversion of the reflected light. The image reading section 20 then reads an original image with the CCD, and converts the read image signal into digital image data with the A/D converter. The image is not limited to an image such as a figure and a photograph here, but includes character image such as a character and a sign, and the like.

The operation section 30 is equipped with various function keys such as a start key for instructing a start of printing and numeric keys. When these function keys or the touch panel 40 are operated, the operation section 30 outputs a corresponding operation signal to the control unit 2.

The display section 50 is equipped with a liquid crystal display (LCD) formed to be one body with the touch panel 40 and makes the LCD display various operation screens for printing operations.

The printer section 60 performs printing output by the electrophotography system on the basis of the image data input from the image processing unit 1 of the main body section 10. In the electrophotography system, a laser light source radiates a laser light onto a photosensitive drum to perform exposure and forms an electrostatic latent image. A developing unit blows toner against the electrostatic latent image to produce a toner image and transfers the toner image to a sheet of recording paper to form an image thereon. The printing output is performed by using four color materials of yellow (Y), magenta (M), cyan (C), and black (K) in the present embodiment. When image data of each color material has been input into the printer section 60, the printer section 60 performs the frequency modulation and the pulse width modulation (PWM) of the input data with a frequency modulation/PWM conversion processing unit 61 and inputs the modulated signal to an LD driver 62. The LD driver 62 drives the laser light source on the basis of the input modulated signal to control the laser light radiated from the laser light source, that is, an exposure quantity.

Next, each unit of the main body section 10 is described.

The control unit 2 integrally controls the operation of each section of the MFP 100 in accordance with various control programs, such as a system program and a printing processing program, which are stored in the storage unit 3.

The storage unit 3 stores the various control programs, such as the system program and the printing processing program. Moreover, the storage unit 3 stores averaging patterns to be used in the image processing unit 1 at the time of averaging processing, screen patterns to be used at the time of screen processing, and their processing period information. The storage unit 3 sores the averaging patterns, the screen patterns, and the processing period information to each of the colors of Y, M, C, and K, which the MFP 100 can output. Incidentally, the processing period information is the information of a shift quantity (the number of shifted pixels) to be referred to when the averaging patterns and the screen patterns are applied to a processing target image.

The DRAM control unit 4 controls the input and the output of image data stored in the DRAM 5.

The DRAM 5 is an image memory storing image data.

Figure 2:
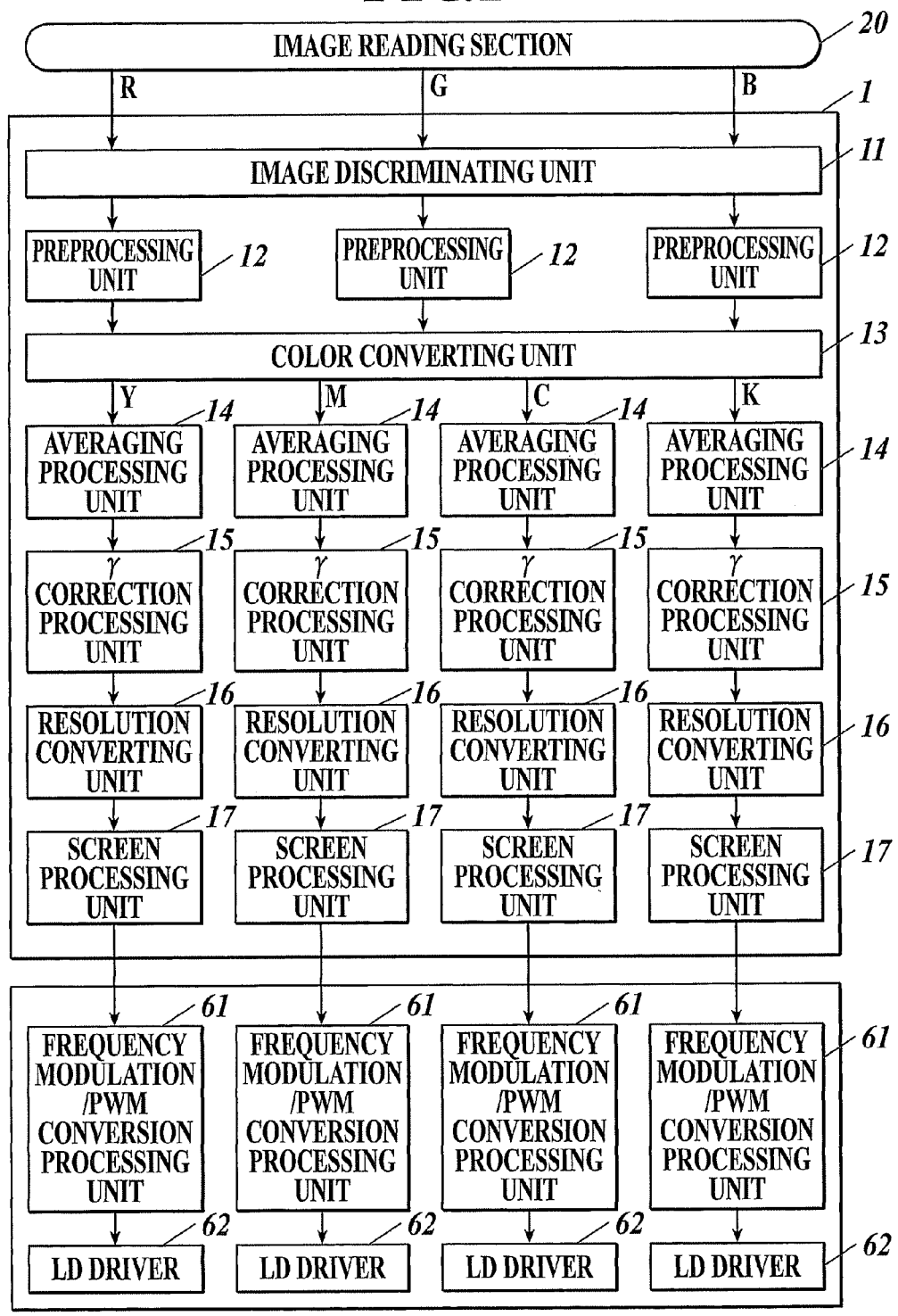
FIG. 2 is a diagram showing the configuration of an image processing unit in FIG. 1.

As shown in FIG. 2, the image processing unit 1 is composed of an image discriminating unit 11, preprocessing units 12, a color converting unit 13, averaging processing units 14, γ correction processing units 15, resolution converting units 16, screen processing units 17, and the like. Incidentally, the preprocessing units 12 is provided to every color of R, G, and B, and the averaging processing units 14, the γ correction processing units 15, the resolution converting units 16, and the screen processing units 17 are provided to every color of C, M, Y, and K.

The image discriminating unit 11 discriminates the attribute (character, line drawing, photographic image) of image of each pixel of input image data of R, G, and B, and generates an image discrimination signal TAG indicating the discrimination result. If the image discriminating unit 11 discriminates an attribute to be a character, then the image discriminating unit 11 sets the image discrimination signal TAG at zero; if a line drawing, at one; and if a photographic image, at two. The image discriminating unit 11 outputs the set image discrimination signals TAG to the preprocessing units 12 together with the image data of each color.

The preprocessing units 12 perform various kinds of correction processing to the input image data of R, G, and B. The correction processing includes shading correction processing correcting luminance shading caused by the image reading section 20, I-I' conversion processing converting the luminance characteristics peculiar to the CCD of the image reading section 20 into the optimum luminance characteristics corresponding to the human visual characteristic, sharpening processing using a modulation transfer function (MTF) filter, variable power processing performing expansion or contraction according to a specified output size (A4 size, B5 size, and the like) to change the size of the whole image, γ conversion processing converting a luminance linear characteristic into a density linear characteristic, and the like. The image data after the processing is output to the color converting unit 13.

The color converting unit 13 performs color correction to each input image data of R, G, and B, and after that converts the image data into those corresponding to color materials Y, M, C, and K, which the MFP 100 can output. Each image data of Y, M, C, and K, which has been generated by the color conversion, is output to the averaging processing units 14, and after that processing is sequentially performed in the order of averaging processing, γ correction processing, resolution converting processing, and screen processing.

Each of the averaging processing units 14 executes the averaging processing of replacing the pixel values of the pixels of input image data in each of a certain fixed area with the average value of those pixel values. To put it concretely, a matching table mt, which is shown in FIG. 3 and is composed of n pixels×m pixels, is matched with a processing target image, and the averaging is performed to each area according with an averaging pattern Pa set in the matching table mt.

The processing unit area and the processing period of the averaging processing are preferably the same as those of the screen processing. By setting the processing unit area to be the same as that of the screen processing, it becomes possible to hold the sharpness of the dot shapes generated by the screen processing. By setting the processing period to be the same as that of the screen processing, it becomes possible to suppress the generation of moiré owing to the discordance of periodicity. In the first embodiment, a description is given to the example in which the averaging pattern Pa, which is the processing unit area of the averaging processing, is accorded with the screen pattern, which is the processing unit area of the screen processing, and the processing periods of the averaging processing and the screen processing are made to be the same period.

The averaging pattern Pa shown in FIG. 3 specifies the pixels to be the targets of averaging (hereinafter referred to as averaging target pixels) in the pixels in the image area matched with the matching table mt. The averaging pattern Pa can be differently set to each color material of C, M, Y, and K as shown in FIG. 4. The averaging pattern Pa shown in FIG. 3 corresponds to the M color.

Figure 5:
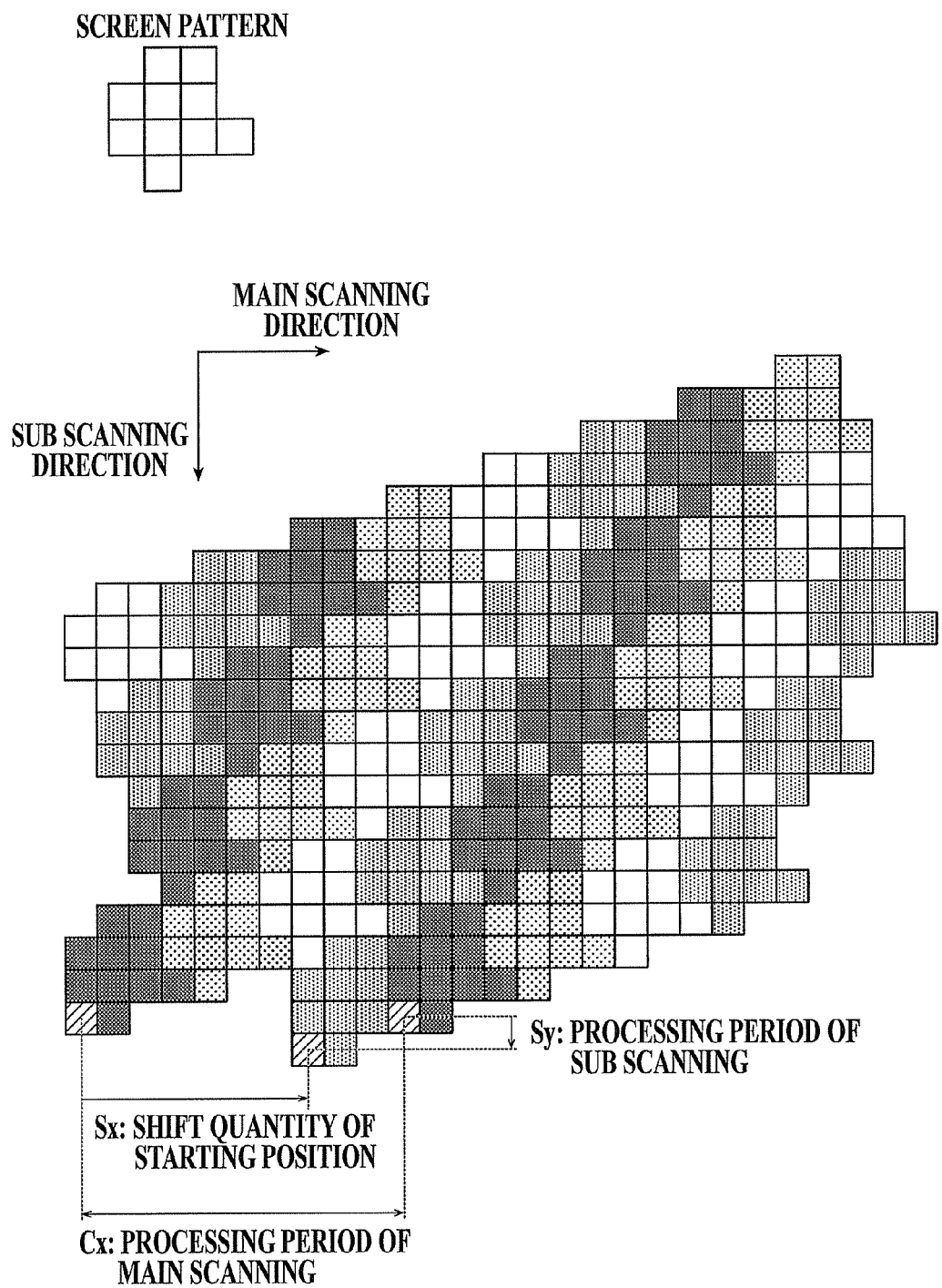
FIG. 5 is a conceptual diagram showing a state of screen processing using a screen pattern.

Moreover, as described above, the averaging pattern Pa has the same shape and the same size as those of the screen pattern used in the screen processing. FIG. 5 shows the state in which the screen pattern of the M color is matched with the processing target image at the time of screen processing. Because the screen pattern is designed to a shape so that adjacent screen patterns may be mutually complemented, the dots formed by the screen patterns have periodicity in the shape of lines as shown in FIG. 5. The lines are screen lines. Incidentally, each line is decorated with a pattern in FIG. 5 in order to be able to be easily discriminated from the other lines, but each line does not differ from the others in processing.

Figure 6:
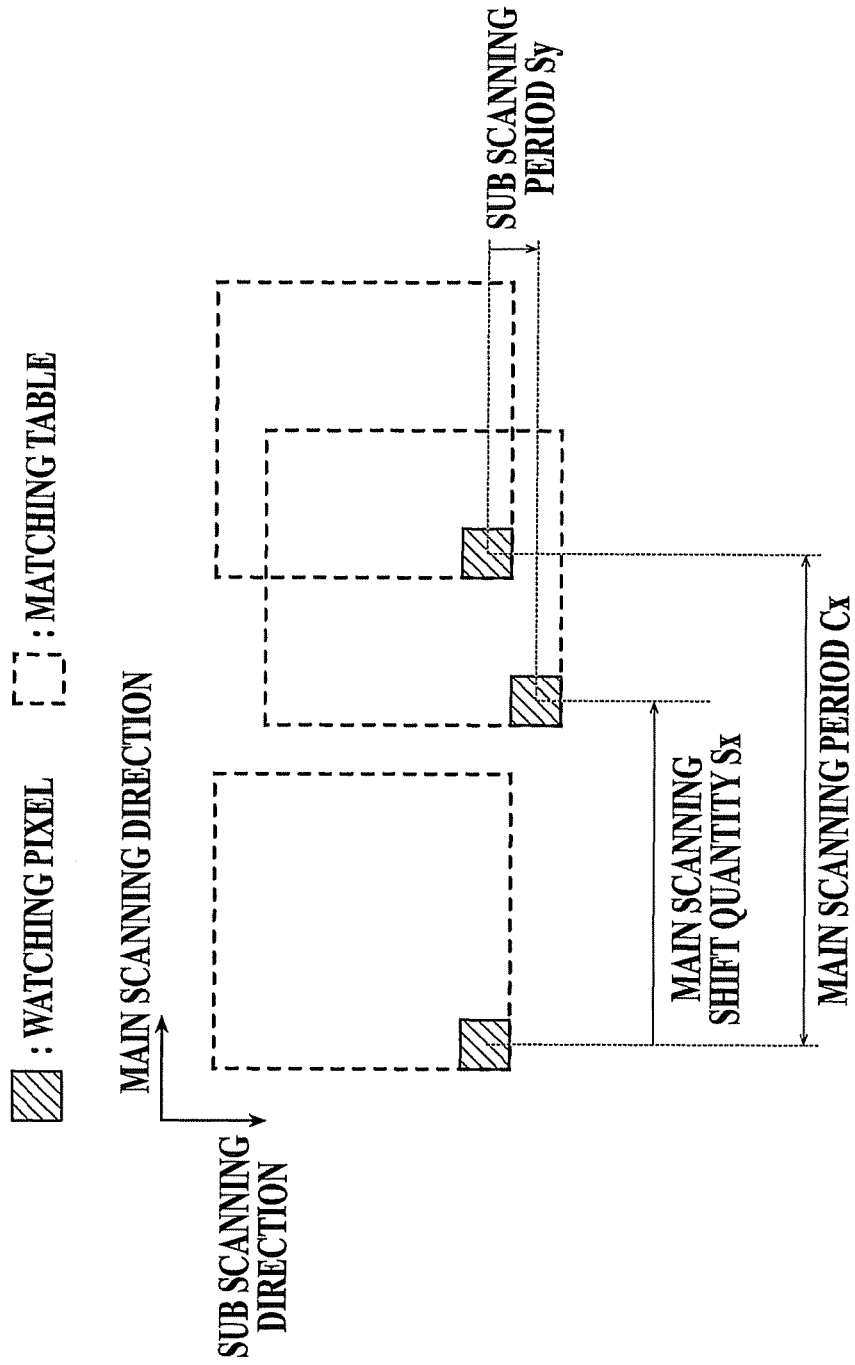
FIG. 6 is a diagram illustrating a period at the time of a scan by a matching table.

As it will be apparent from FIG. 5, the screen lines are generated at a fixed processing period in the main scanning direction and in the sub scanning direction. The processing period in the main scanning direction is denoted by Cx, and the processing period in the sub scanning direction is denoted by Sy. Moreover, because the starting position from which processing is started is shifted in the main scanning direction every sub scanning, the shift quantity is denoted by Sx. In the averaging processing, as shown in FIG. 6, image data and the matching table mt are matched with each other at the same period as that of the processing period of the screen line, and averaging is executed every matched image area.

The matching table mt is a matrix table of 6 pixels×6 pixels. The matching table mt specifies the pixels in the averaging pattern Pa as the averaging target pixels, and specifies the other pixels as the non-averaging target pixels. A weighting coefficient is set to each pixel in the matching table mt (the numerals written in the matching table mt of FIG. 3 are indicate the weighting coefficients). The same weighting coefficient "1" is set in all of the averaging target pixels in the averaging pattern Pa, and the weighting coefficient "0" is set in the non-averaging target pixels.

Moreover, as shown in FIG. 3, the position of a watching pixel is set in the matching table mt. At the time of matching, each pixel constituting the processing target image is scanned (the pixel of the processing target is the watching pixel), and the matching table mt is matched with the image so that the watching pixel accords with the position of the watching pixel defined by the matching table mt.

Next, the averaging performed in the image area matched with the matching table mt is described. An image area f1 shown in FIG. 7 is described as an example.

Each pixel corresponding to the averaging pattern Pa is first extracted in the image area f1 matched with the matching table mt. In the following, the pixels extracted as the averaging targets are referred to as effective pixels.

Next, the average value of the pixel value of each effective pixel is calculated. The average value is obtained by dividing the total sum of the pixel values of the effective pixels by the total sum of their weighting coefficients. The pixel value of each effective pixel corresponding to the position of each averaging target pixel is actually multiplied by the weighting coefficient set in the averaging target pixel, and the average value is obtained from the total sum of each multiplied value. But, because the weighting coefficients of the averaging pattern Pa shown in FIG. 3 are set at "1," the pixel value of each effective pixel after being multiplied by the weighting coefficient is the same as the pixel value before being multiplied. Accordingly, the total sum of the pixel values of the effective pixels is simply calculated here.

Figure 7:
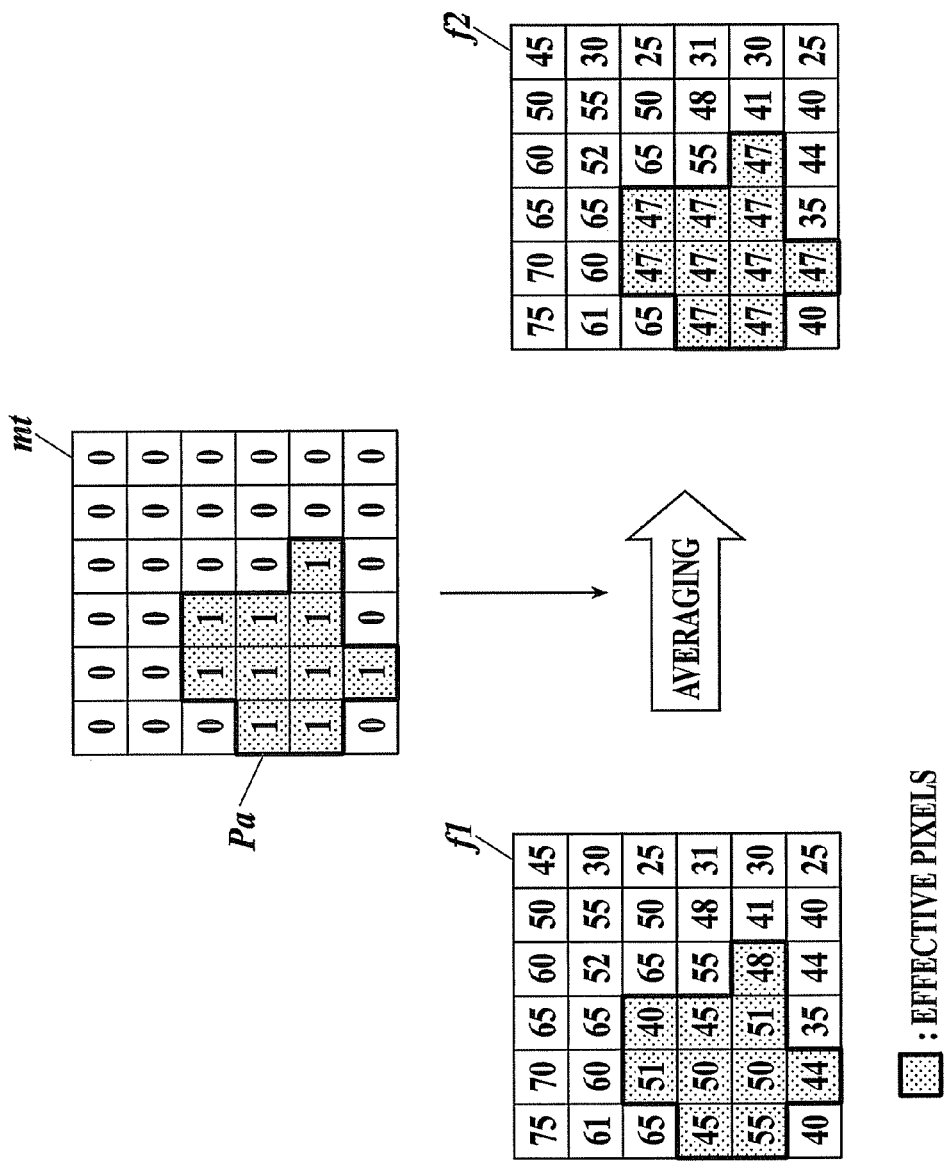
FIG. 7 is a diagram illustrating averaging that is performed to each processing unit area using an averaging pattern.

In the example shown in FIG. 7, because the total sum of respective pixel values of the effective pixels in the image area f1 is "479," and the number of the effective pixels are "10," the average value is "47" (by omitting the fractional part of 47.9).

After the calculation of the average value, the respective pixel values of the effective pixels are replaced with the average value. As the result, the image area f1 changes to an image area f2 in which only the pixels in the averaging pattern Pa are uniformly averaged.

Incidentally, the averaging processing unit 14 refers to the image discrimination signal TAG pertaining to the averaging target pixels before performing the averaging mentioned above. If any of the pixels at which the image discrimination signal TAG is zero or one exists, the pixel at which the TAG=0 or 1 is discriminated as a non-averaging target pixel and is excluded from the calculation of the average value. That is, by excluding the pixels having image attributes required to be sharp, such as those of a character and a line drawing from the targets of averaging, the holding of the sharpness of the character image and the line drawing image is attained.

Figure 8:
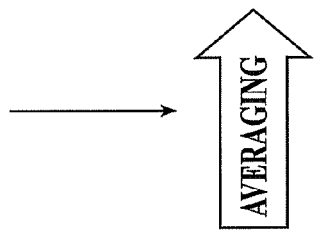
FIG. 8 is a diagram illustrating averaging in the case where non-averaging target pixels are included in a processing unit area.

For example, as shown in FIG. 8, if there are non-averaging target pixels, having the image discrimination signals TAG=0 or 1, in an image area f3, the pixels that correspond to the averaging pattern Pa and do not correspond to the non-averaging target pixels, having the image discrimination signal TAG=0 or 1, are set as the effective pixels, and the pixel values of the effective pixels are extracted. Then, the average value of the extracted pixel values is calculated. The average value is, similarly to the above description, is a solution of dividing the total sum of the pixel values of the effective pixels by the total sum of weighting coefficients. In the example shown in FIG. 8, the respective pixel values of the effective pixels "51," "40," "45," and "48" are extracted, and the total sum of the extracted pixel values is divided by the total sum, "4," of the weighting coefficient. Next, the respective pixel values of the effective pixels are replaced by the obtained average value, and thereby the image area f3 is changed to an averaged image area f4.

Figure 9:
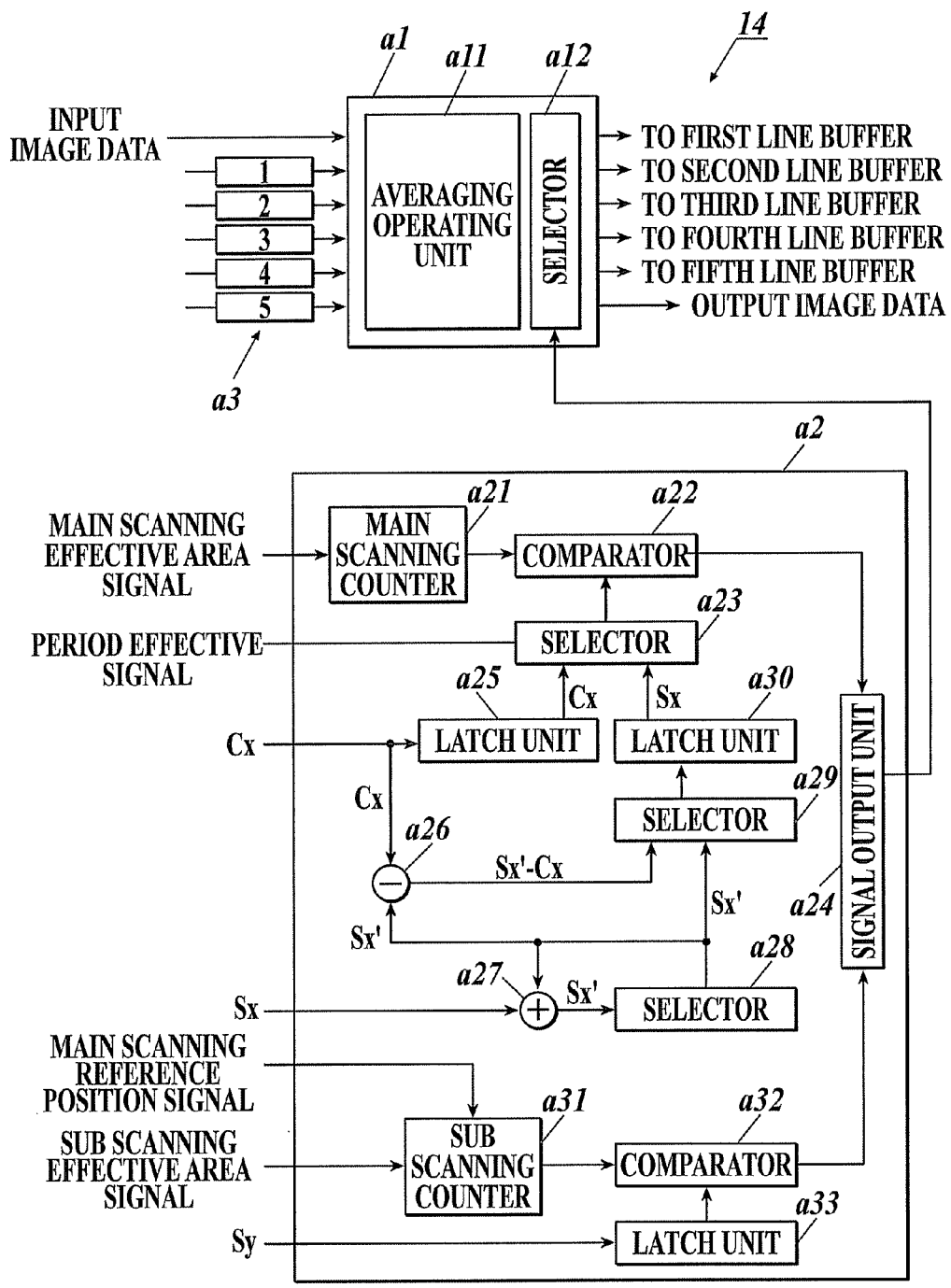
FIG. 9 is a diagram showing the configuration of an averaging processing unit.

The above averaging processing is realized by a configuration shown in FIG. 9. FIG. 9 is a diagram showing the configuration of each of the averaging processing units 14. The averaging processing unit 14 is composed of an operation unit a1, a signal generating unit a2, and a line buffer memory a3, which are shown in FIG. 9, as well as a signal control unit (not shown) inputting a control signal to the signal generating unit a2. The line buffer memory a3 includes a first to a fifth line buffer memories in order to hold the image data for five (=N−1) main scanning lines except for one line, which are directly input, because the size of the matching table mt in the sub scanning direction is six pixels (N=6). The input image data of the first input line and the five lines at the subsequent stages of the first input line is sequentially input to each pixel of the averaging processing units 14.

The operation unit a1 is composed of an averaging operating unit a11 performing the operation of the averaging mentioned above, a selector a12, and the like. The averaging operating unit a11 performs the above averaging operation when the pixel values for six pixels by six pixels corresponding to the matching table mt have been input into the operating unit a11, and outputs a calculated average value to the selector a12. The average value and the original pixel values are input from the averaging operating unit a11 and the line buffer memory a3, respectively, into the selector a12. The selector a12 selects any one of the input average value and the original pixel values on the basis of an averaging effective signal, input from the signal generating unit a2. To put it concretely, when the averaging effective signal is in its on-state, the selector a12 selects the average value and outputs the selected average value as the output value (output image data) of a watching pixel. On the other hand, when the averaging effective signal is its off-state, the selector a12 selects the original pixel values to output the original pixel values as the output values of watching pixels. That is, matching by the matching table mt is performed by taking the position of the watching pixel at which the averaging effective signal is made to the on-state, and averaging is performed.

The signal generating unit a2 generates an averaging effective signal according to shift signals indicating shift quantities Cx and Sy corresponding to the processing periods in the main scanning direction and in the sub scanning direction, respectively, and a shift signal indicating a shift quantity Sx of the starting position of averaging processing in the main scanning direction, and outputs the generated averaging effective signal to the operation unit a1. These shift signals indicate the parameter values of the shift quantities Cx, Sx, and Sy, and are generated and input by the signal control unit on the basis of the processing period information stored in the storage unit 3. Incidentally, the shift signal Sx is once output when the averaging processing shifts into the sub scanning direction by the shift quantity Sy, and the shift signal Sx=0 is output at the other time. Moreover, the shift signal Sx is controlled by the signal control unit so as not to be output in a main scanning line the first pixel of which is set as the starting pixel of averaging processing.

Moreover, a main scanning effective area signal, a sub scanning effective area signal, a period effective signal, and a main scanning reference position signal are input into the signal generating unit a2 besides the above shift signals. Any of the signals are generated by the signal control unit and are input by the signal control unit. The main scanning effective area signal and the sub scanning effective area signal are signals indicating respective printable ranges in the main scanning direction and in the sub scanning direction, and are made to be on in a printable range and off in an outside range of the printable range. The period effective signal is a signal indicating the position at which main scanning based on a processing period Cx in the main scanning direction is started. The period effective signal is made to be on until the starting position of the main scanning based on the processing period Cx, and is made to be off after the starting position. Moreover, the main scanning reference position signal is a signal indicating the starting position of each main scanning line, and outputs an on-pulse immediately after every shifting by one line in the sub scanning direction. The period effective signal recognizes the starting position of a main scanning line on the basis of the main scanning reference position signal, and the on/off of the period effective signal is controlled on the basis of the region from the starting position to the position where the main scanning based on the processing period Cx is started as the boundaries.

In the signal generating unit a2, a main scanning counter a21 repeatedly counts the numbers of from one to Cx, and the counted number is output to a comparator a22. Incidentally, the counting is performed only in the on-state of the main scanning effective area signal.

The timing of the shift signal Cx is adjusted by a latch unit a25, and after that the shift signal Cx is output to a selector a23 and a subtracter a26.

The input shift signal Sx is input into an adder a27. In the adder a27, a shift signal Sx output at the time of the processing of a main scanning line preceding by the sift quantity Sy in addition to the shift signal Sx that is newly input from the signal control unit, and consequently the adder a27 adds these shift signals Sx. The shift signal after the addition is denoted by Sx'. The shift signal Sx' is output to a selector a29 and the subtracter a26.

The subtracter a26 calculates the difference Sx'−Cx between the shift signal Sx' and the shift signal Cx, and outputs the calculated difference to the selector a29.

When the difference Sx'−Cx is negative, namely (Sx'−Cx)<0, the selector a29 selects the shift signal Sx'. When the difference Sx'−Cx is positive, namely (Sx'−Cx)>0, the selector a29 selects the shift signal Sx'−Cx. The selector a29 outputs the selected shift signal to the selector a23 through a latch unit a30.

The selector a23 selects either the shift quantity Cx or the shift signal Sx' (or Sx'−Cx) on the basis of the input period effective signal. Because the period effective signal is set to be on until the starting position of the main scanning based on the processing period Cx and to be off after the starting position, the selector a23 selects the shift signal Sx' (or Sx'−Cx) when the period effective signal is on, and selects the shift signal Cx when the period effective signal is off to output the selected shift signal to the comparator a22.

The comparator a22 compares the input shift signal Cx or Sx' (or Sx'−Cx) with the counted number of the main scanning counter a21. When the input shift signal Cx or SX' (or SX'−Cx) and the counted number accord with each other, the comparator a22 outputs an on-signal to a signal output unit a24. When they do not accord with each other, the comparator a22 outputs an off-signal.

On the other hand, a sub scanning counter a31 repeatedly counts the numbers of from one to Sy in the sub scanning direction, and outputs the counted number to a comparator a32. Incidentally, the sub scanning counter a31 detects a shift into the sub scanning direction on the basis of the main scanning reference position signal to perform the counting. The timing of the shift signal Sy is adjusted by a latch unit a33, and after that the shift signal Sy is output to the comparator a32. The comparator a32 compares the input counted number of the sub scanning with the shift signal Sy. When the counted number and the shift signal Sy accord with each other, the comparator a32 outputs an on-signal to the signal output unit a24. When they do not accord with each other, the comparator a32 outputs an off-signal.

The signal output unit a24 is composed of an AND circuit. The signal output unit a24 generates an averaging effective signal, which is on when both the signals input from the comparators a22 and a32 are on-signals, and which is off in the other cases. The signal output unit a24 outputs the generated averaging effective signal to the operation unit a1.

Figure 10:
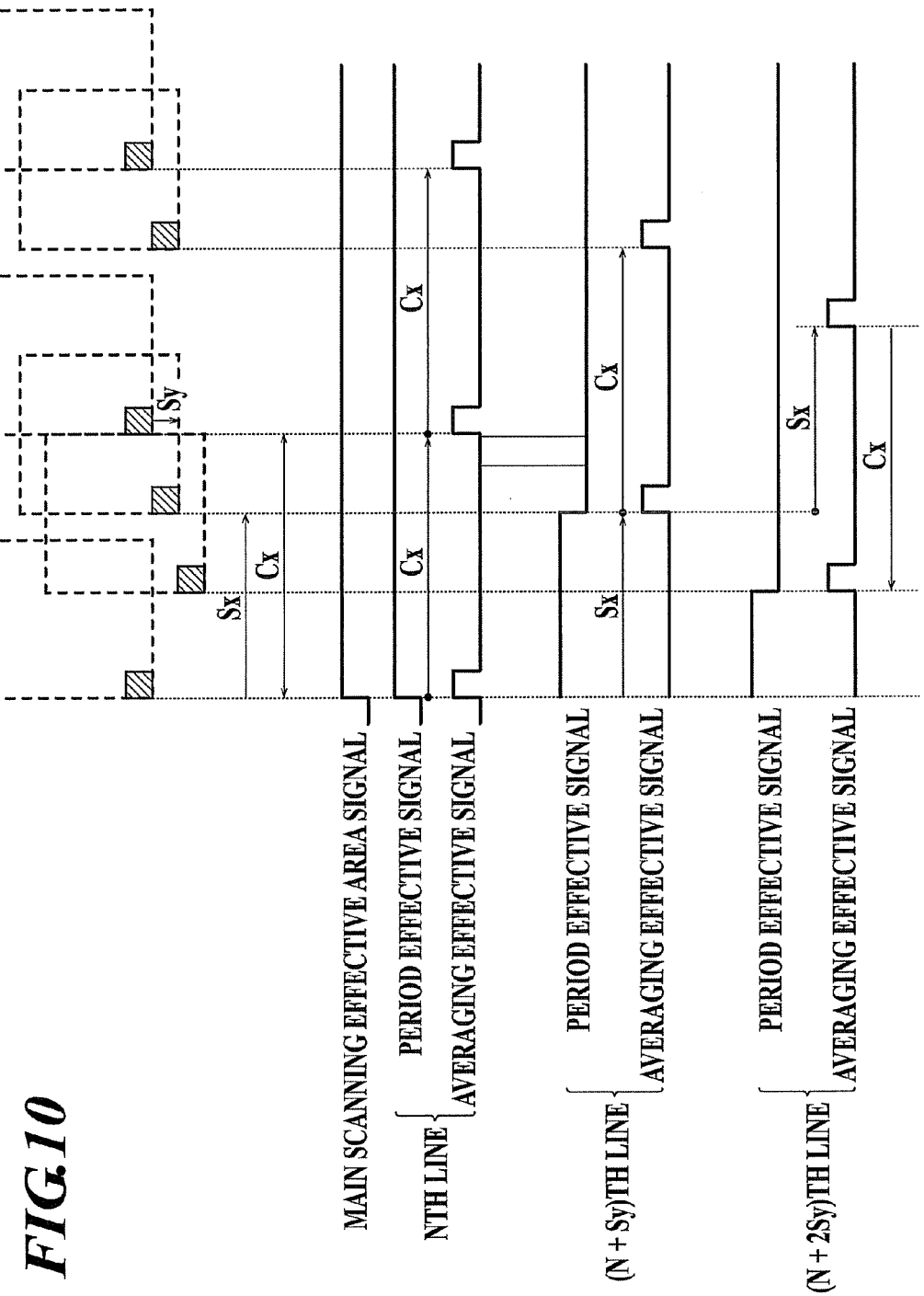
FIG. 10 is a diagram showing a time chart of averaging effective signals generated in a control unit of FIG. 9.

A time chart of the averaging effective signal generated in the signal generating unit a2 is shown in FIG. 10.

As shown in FIG. 10, in a printable range, the main scanning effective area signal and the sub scanning effective area signal are in their on-state. A description is sequentially given here from the processing of the Nth line in which the first pixel is set as the starting pixel of the averaging processing in the main scanning direction.

At the Nth line, a period effective signal that switches from its off-state to its on-state at the timing when the main scanning effective area signal is changed to its on-state is input at that timing. Consequently, at the Nth line, the selector a23 does not select the shift signal Sx and always outputs the shift signal Cx. As the result, the comparator a22 outputs the on-signal only when the counted number of the main scanning reaches the shift quantity Cx. Consequently, an averaging effective signal outputting an on-signal for one pixel every period Cx is generated.

When the main scanning of the Nth line is completed, the comparator a32 outputs an on-signal to the signal output unit a24 when the counted number of the sub scanning next becomes the shift quantity Sy. Consequently, it is at the (N+Sy)th line which is shifted from the Nth line to the sub scanning by the shift quantity Sy that the averaging effective signal next becomes the on-state.

At the (N+Sy)th line, the adder a27 outputs the shift signal Sx'=0+Sx=Sx because the shift signal Sx is not output at the Nth line just before the (N+Sy)th line. Consequently, a shift signal Sx−Cx is output from the subtracter a26 to the selector a29, and the selector a29 outputs the shift signal Sx'=Sx to the selector a23 because (Sx−Cx)<0. Because the selector a23 selects the shift signal Sx' when the period effective signal is the on-state, and selects the shift signal Cx when the period effective signal is the off-state, as the averaging effective signal an on-signal for one pixel is output from the pixel position shifted from the first pixel by the shift quantity Sx every period Cx.

Furthermore, at the (N+2Sy)th line, which is line-shifted by the shift quantity Sy into the sub scanning direction, a period effective signal that is being its on-state from the first pixel position to a pixel position of 2Sx−Cx and changes to its off-state after the latter pixel position is input. On the other hand, the adder a27 adds the shift quantity Sx output from the (N+Sy)th line just before the (N+2Sy)th line and the shift quantity that is newly input together, and outputs the shift quantity Sx'=2Sx. Consequently, because the difference Sx'−Cx output from the subtracter a26 becomes (2x−Cx)>0, the selector a29 outputs a shift signal 2x−Cx to the selector a23. The selector a23 selects the shift signal 2x−Cx input from the selector a29 when the period effective signal is the on-state, and selects the shift signal Cx input from the latch unit a25 when the period effective signal is the off-state. Consequently, at the (N+2Sy)th line, an averaging effective signal outputting an on-signal for one pixel from the pixel position shifted from the first pixel by the sift quantity of 2Sx−Cx every period Cx.

When the averaging effective signal turns to its on-state, the matching by the matching table mt is performed around the position of the watching pixel in the processing target image, and the pixel values of the pixels corresponding to the averaging pattern Pa is replaced with the average value. The matching and the replacement are repeated in accordance with the averaging effective signal, and consequently the averaging processing can be performed to all of the pixels in the processing target image correspondingly to the averaging pattern Pa.

When the aforesaid averaging processing is completed, the processed image data is output to the γ correction processing units 15.

Each of the γ correction processing units 15 performs the gradation conversion of the image data input by using a look up table (LUT) prepared for γ correction in advance to perform γ correction processing. The image data of each color material which has received the γ correction processing is severally output to each of the resolution converting units 16.

Each of the resolution converting units 16 performs the processing of converting the resolution R1 of the image data that has received the γ correction processing into resolution R2 (R1<R2). The resolution converting processing performs the conversion to the resolution of a specified magnification R (R=R2/R1). For example, if the resolution at the time of reading is 600 dpi and the specified magnification R=2, the conversion to the resolution of 1200 dpi is performed. Consequently, a pixel is divided in quarters, and the pixel value of the original pixel is allotted to each of the divided pixels.

Each of the screen processing units 17 performs screen processing of input image data by the technique of a systematic dither method or the like. At the time of screen processing, as shown in FIG. 5, a screen pattern having the same shape and the same size as those of the averaging pattern Pa is used, and the screen processing is performed at the same periods Cx, Sx, and Sy as those of the averaging processing. A plurality of threshold values is set in the screen pattern. Image data is matched with the screen pattern; the pixel value of each pixel in the matched image area is compared with the threshold value of the screen pattern corresponding to each of the pixel positions; and thereby the output value of each pixel is determined. The output value is a multiple value. Incidentally, any of the techniques of the screen processing may be applied.

The processed image data after the screen processing is output to the frequency modulation/PWM conversion processing unit 61 of the printer section 60, and printing output based on the processed image data is performed.

As described above, according to the first embodiment, the averaging processing is performed at the same period as that of the screen processing by using the averaging pattern Pa having the same shape and the same size as those of the screen pattern used for the screen processing. Moreover, the resolution conversion is performed after the averaging processing and just before the screen processing. Thereby, the number of the line buffer memories a3 for holding the mage data at the time of the averaging processing can be suppressed to the bare minimum number of the number of elements of the averaging pattern in the sub scanning direction N−1. If the resolution conversion is performed before the averaging processing and the magnification thereof is set to R, the number of the line buffer memories a3 becomes R×N−1. Because the same number of line buffer memories becomes necessary not only in the averaging processing but also in the processing at the subsequent stages, the cost increases as the circuit configuration expands in order to secure the line buffer memories. However, according to the first embodiment, because only each of the screen processing units 17 is needed to be equipped with (R×N−1) line buffer memories, the problems of the expansion of the circuit configuration and of a high cost can be avoided.

Incidentally, the first embodiment described above is only a suitable example to which the present invention is applied, and the present invention is not limited to the first embodiment.

For example, although the weighting coefficient to be set in the averaging pattern has been described to be a binary number of "1" or "0," the weighting coefficient may be set as multiple values as shown in FIGS. 11A and 11B. FIGS. 11A and 11B show an example of an averaging pattern Pb in which multiple-valued weighting coefficients are set. In FIG. 11A, in averaging target pixels multiple-valued weighting coefficients are set. In the following, the averaging processing using the averaging pattern Pb is described.

When averaging of an image area f5 shown in FIG. 11B is performed, the pixel values of the effective pixels corresponding to the averaging pattern Pb are first extracted. Next, the extracted pixel values are multiplied by the weighting coefficients set in the averaging target pixels in the averaging pattern Pb. It is an image area f6 that shows the multiplied values. An average value is then calculated by dividing the total sum of the respective multiplied values by the total sum of the respective weighting coefficients. In the example of the image area f6, the total sum of the multiplied values is "1462," and the total sum of the weighting coefficients is "30." Consequently, the average value is "48" (by truncating 48.733). The pixel values of the effective pixels are replaced with the calculated average value, and thereby an averaged image area f7 can be obtained.

Second Embodiment

Figure 13:
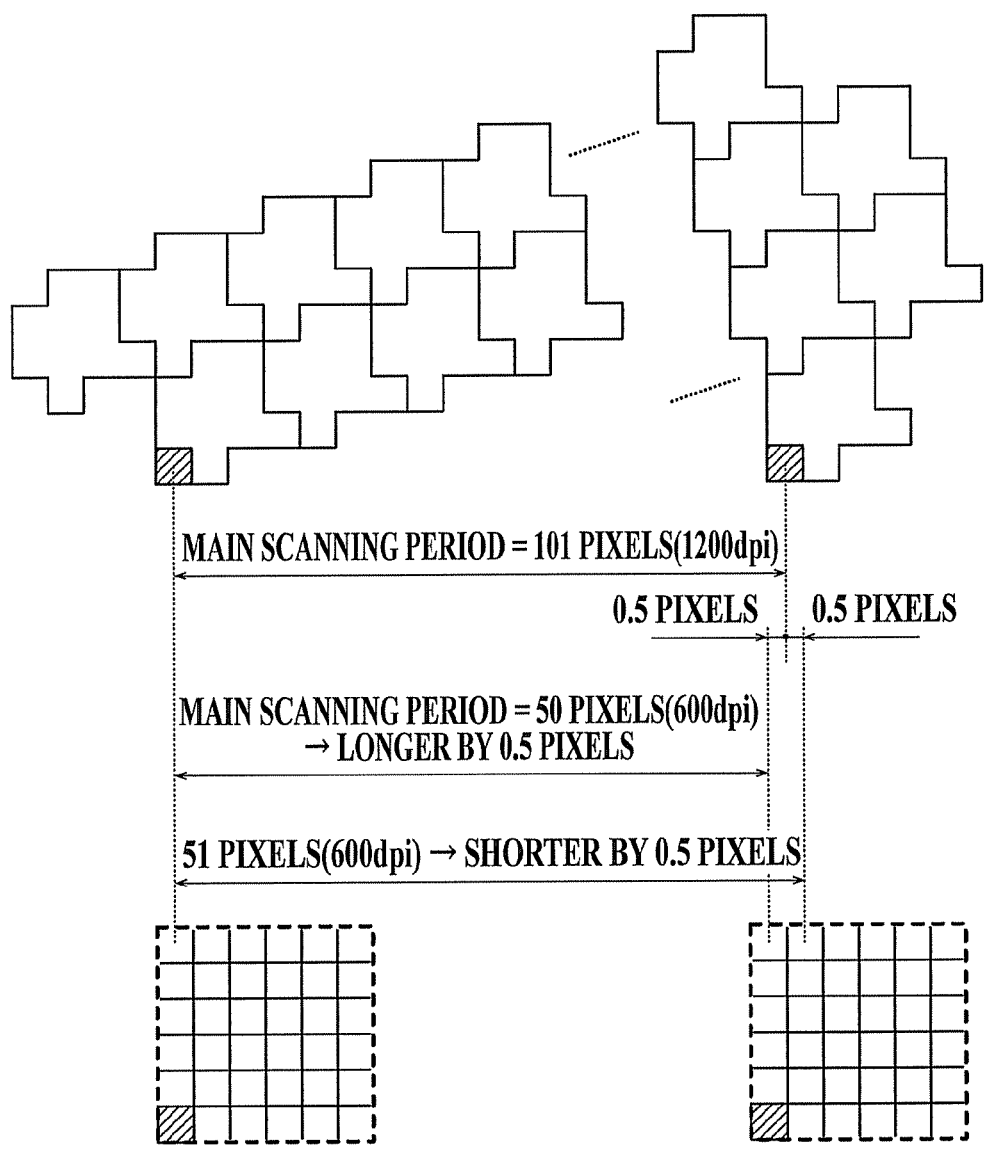
FIG. 13 is a diagram illustrating a difference produced in processing periods as a result of the difference of the size of the matching table in the averaging processing and in the screen processing.

If the resolution converting processing is performed between the averaging processing and the screen processing as the first embodiment, then the processing periods do not sometimes accord with each other owing to the different area sizes of the matching tables in the averaging processing and in the screen processing from each other, and the processing periods sometimes become almost the same. For example, a case is shown in FIG. 12. In the case, the resolution is 600 dpi and the matching table has a size of 6 pixels×6 pixels at the time of the averaging processing. However, the resolution is converted to 1200 dpi at the screen processing, and the matching table for screen processing at the resolution has the size of 11 pixels×11 pixels. In this case, as shown in FIG. 13, the processing period $Cx_{1200}$ in the screen processing is 101 $pixels_{1200}$ (the subscript 1200 indicates that the number of the pixels is that of 1200 dpi. In the following, the same is true). If the processing period $Cx_{600}$ in the averaging processing is made to be 50 $pixels_{600}$ (the subscript 600 indicates that the number of the pixels is that of 600 dpi. In the following, the same is true.), the processing period of the averaging processing is shorter than that of the screen processing by 0.5 $pixels_{600}$. On the other hand, if the processing period $Cx_{600}$ in the averaging processing is made to be 51 $pixels_{600}$, the processing period of the averaging processing is longer than that of the screen processing by 0.5 $pixels_{600}$.

Although the difference itself in one period is small, the difference expands every addition of the period, and the periods in the averaging processing and in the screen processing are finally greatly shifted from each other. In such a state, the advantage of holding the sharpness by performing the averaging processing in synchronization with the processing period of the screen processing cannot be attained.

Figure 14:
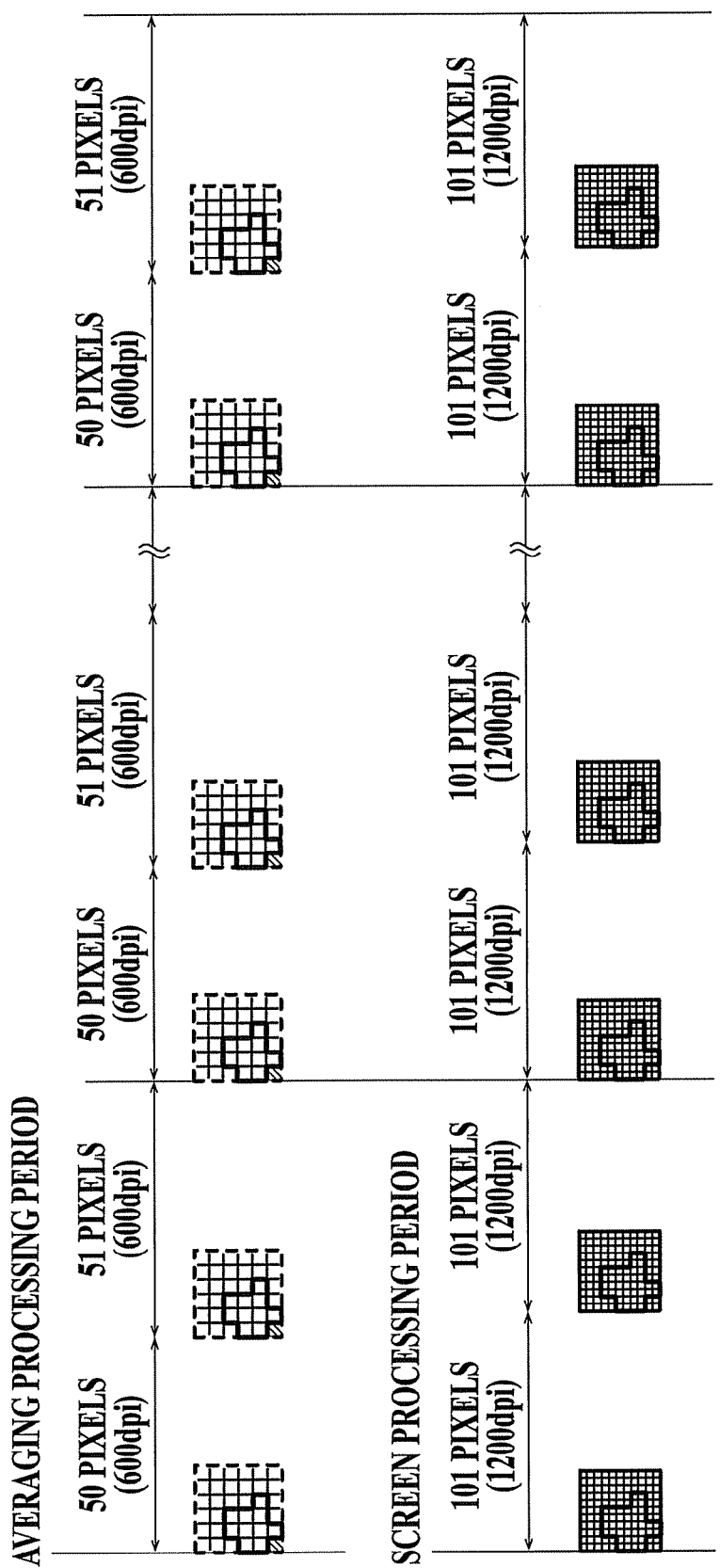
FIG. 14 is a diagram showing the state in which the averaging processing according to a second embodiment offsets the difference of the processing period with that of the screen processing at the time of a magnification R=2.

In this case, as shown in FIG. 14, if the period $Cx_{600}$=50 $pixels_{600}$ in the averaging processing is alternately switched between 50 $pixels_{600}$ and 51 $pixels_{600}$, then the two periods, that is, $2Cx_{600}$ of the averaging processing accord with the two periods ($2Cx_{1200}$) of the screen processing. That is, although the difference of 0.5 $pixels_{600}$ arises for one period, the difference is offset for the total of two periods, and the processing periods of the averaging processing and the screen processing can be accorded with each other.

Accordingly, in the second embodiment, a description is given to an example of according the processing periods for R periods when the processing periods of the screen processing and the averaging processing differ from each other owing to the resolution converting processing.

Figure 15:
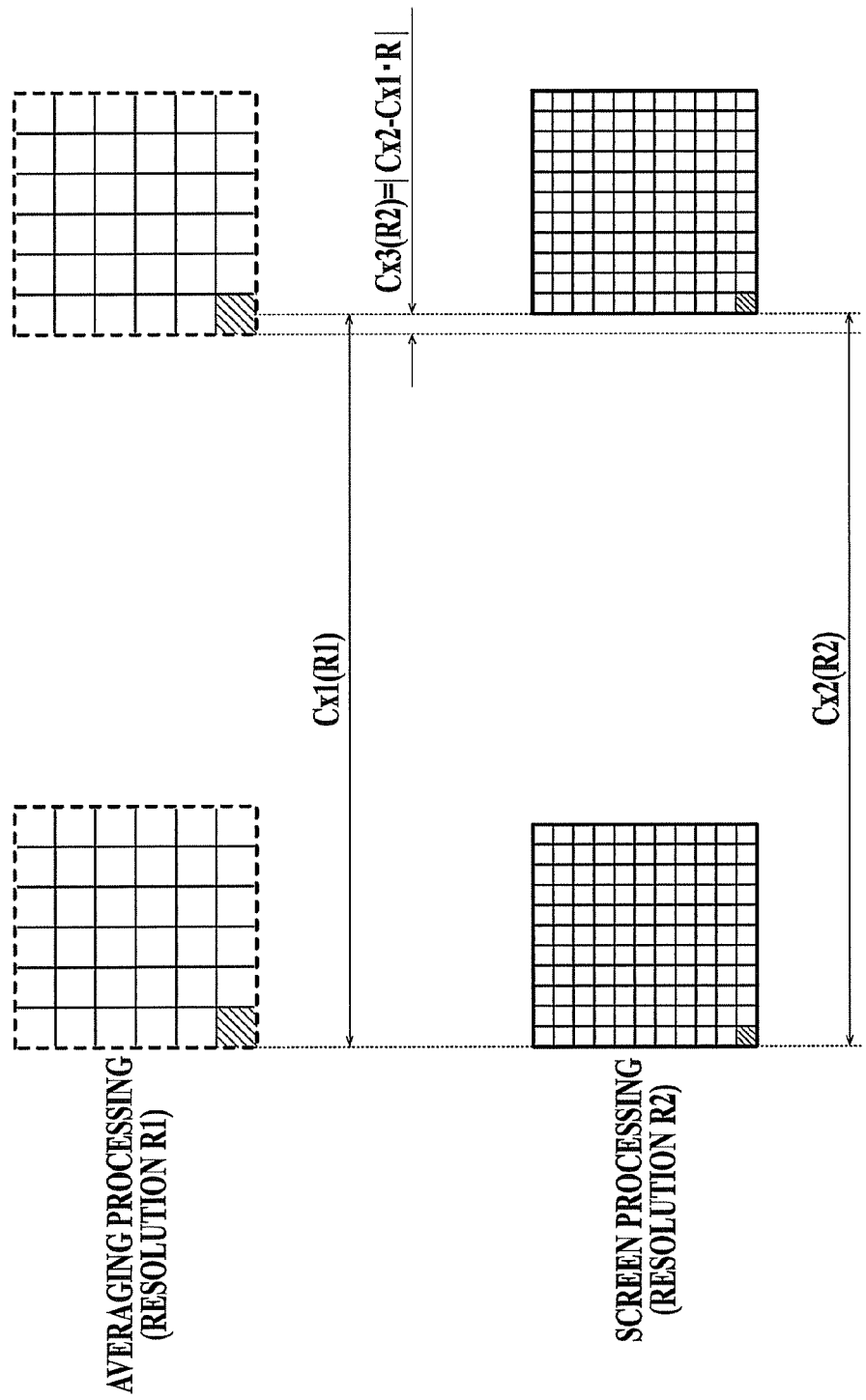
FIG. 15 is a diagram showing the processing period of each of the averaging processing and the screen processing and the differences between them.

As shown in FIG. 15, the resolution before resolution converting processing is denoted by R1, the resolution after the resolution converting processing is denoted by R2, and the magnification is denoted by R (R=R2/R1). Moreover, if the processing period of a processing unit area (an image area matched with the matching table mt) in the main scanning direction at the time of averaging processing is denoted by $Cx1_{(R1)}$ (the subscript in parentheses indicates resolution, and indicates that the period is expressed by the number of pixels at the resolution. In the following, the same is true.), the processing period of the processing unit area in the main scanning direction at the time of screen processing is denoted by $Cx2_{(R2)}$, and the difference between these processing periods $Cx1_{(R1)}$ and $Cx2_{(R2)}$ is denoted by $Cx3_{(R2)}$, then the difference $Cx3_{(R2)}$ can be expressed by the following expression.

$$Cx3_{(R2)}=|Cx2_{(R2)}-Cx1_{(R1)}\times R|$$

If the processing period $Cx1_{(R1)}$ is changed to the combination of the following $Cx11_{(R1)}$ and $Cx12_{(R1)}$ and the averaging processing is performed by switching the processing periods $Cx11_{(R1)}$ and $Cx12_{(R1)}$ at this time, then the aforesaid difference $Cx3_{(R2)}$ can be offset in the R period.

$Cx11_{(R1)}$: an integer value ZCx of a solution of dividing $Cx2_{(R2)}$ by R $Cx12_{(R2)}$: one selected from the following (1) or (2) according to the obtaining method of the integer value ZCx of $Cx11_{(R1)}$ (1) If fractional part is omitted at the time of obtaining the integer value ZCx, $$ZCx(ZCx=Cx11_{(R1)})+1$$

(2) If the fractional part is carried up at the time of obtaining the integer value ZCx, $$ZCx(ZCx=Cx11_{(R1)})-1$$

The generation rate of the processing periods $Cx11_{(R1)}$ and $Cx12_{(R1)}$ are as follows.

$$Cx11_{(R1)}:Cx12_{(R1)}=(R-\text{mod}):\text{mod},$$

where mod is a remainder when the $Cx2_{(R2)}$ is divided by R.

For example, if R1=600 dpi, R2=2400 dpi, and $Cx2_{(R2)}$=203 pixels, then R=2400/600=4, and $Cx2_{(R2)}$/R=203/4=50.75. If the fractional part is omitted, then $Cx11_{(R1)}$=50. Moreover, because the fractional part is omitted, $Cx12_{(R1)}$=$Cx11_{(R1)}$+1.

Furthermore, the remainder mod when $Cx2_{(R2)}$=203 is divided by R=4 is mod=3. Consequently, $Cx11_{(R1)}$: $Cx12_{(R1)}$=(4−3):3=1:3.

Accordingly, the period of the processing period $Cx1_{(R1)}$ in the main scanning direction at the time of the averaging processing is changed as follows: 50, 51, 51, 51, 50, 51, 51, 51, 50 . . . . After elapsing the periods for R=4 times, (50+ 51+51+51)×4=203×4$_{(R2)}$. Then, the period accords with the one at of the time when the period $Cx2_{(R2)}$=203 at the time of screen processing is repeated by four times.

Incidentally, FIG. 15 shows the example of the processing period Cx, but the processing periods of the processing periods Sx and Sy can similarly be switched. Moreover, it is possible to preparing the combinations of two processing periods of the respective processing periods Cx, Sx, and Sy and to independently set about whether these combinations are switched. That is, the processing period pertaining to the shift quantity Cx in the main scanning direction becomes necessary to be switched according to the size of the processing unit area in the main scanning direction, and the processing period pertaining to the shift quantity Sy in the sub scanning direction becomes necessary to be switched according to the size of the processing unit area in the sub scanning direction. Moreover, the processing period Cx defines the density of an averaging target area (the area corresponding to screen dot), and the processing period Cx determines the number of screen lines. On the other hand, the shift quantities Sx and Sy define the positions of an averaging area and determine a screen angle. Consequently, it becomes necessary to make it possible to independently switch each of the shift quantities Cx, Sx, and Sy.

In the case of the processing unit area shown in FIG. 15, differences exist both in the main scanning direction and in the sub scanning direction, and consequently switching is necessary for both the processing periods Cx and Sy.

As for the Sy, which is the processing period in the sub scanning direction, similar operations to the ones in the case of the processing period Cx in the main scanning direction are needed to be performed to obtain a combination of new processing periods $Sy11_{(R1)}$ and $Sy12_{(R1)}$. That is, an integer value ZSy of the solution of dividing the processing period Sy2(R2) of the screen processing in the sub scanning direction by the R is obtained, and set the processing periods $Sy11_{(R1)}$ and $Sy12_{(R1)}$ as follows: $Sy11_{(R1)}$=ZSy, $Sy12_{(R1)}$= ZSy+1 (or ZSy−1). The generation rate is also $Sy11_{(R1)}$: $Sy12_{(R1)}$=(R−mod):mod.

Incidentally, also in the case of performing the switching pertaining to the shift quantity Sx, the combination of the new processing periods $Sx11_{(R1)}$=ZSx and $Sx12_{(R1)}$=ZSx+1 (or ZSx−1) of the shift quantity Sx, and the calculation method of the generation rate are the same as those of the shift quantities Cx and Sy.

Figure 16:
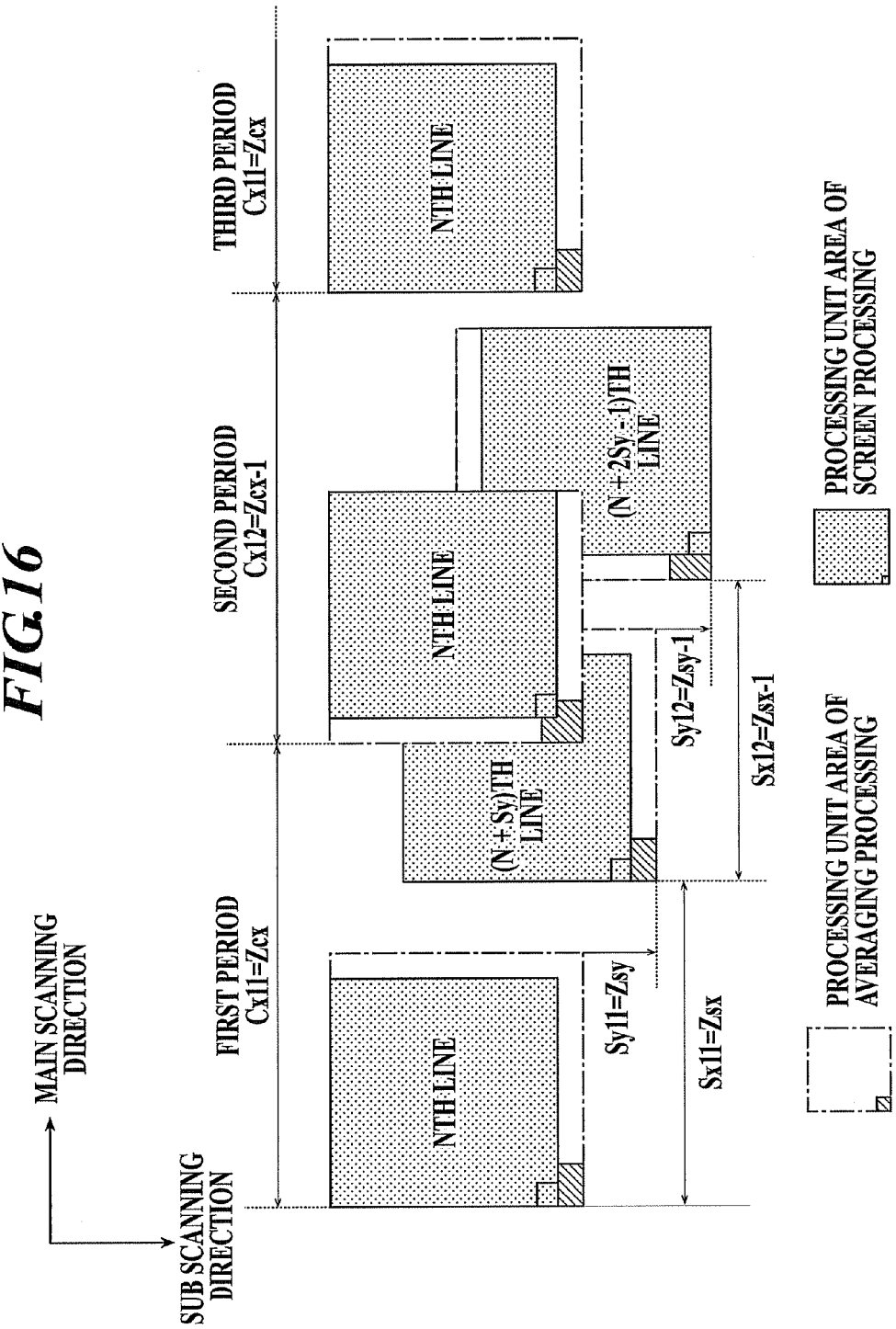
FIG. 16 is a diagram showing a state in which the difference of the processing period is offset from that of the screen processing by the averaging processing according to the second embodiment.

FIG. 16 shows an example of alternately switching the processing periods $Cx11_{(R1)}$ and $Cx12_{(R1)}$ at the time of R=2. At the time of R=2, the generation rate of the processing periods $Cx11_{(R1)}$ and $Cx12_{(R1)}$ is 1:1. The processing periods $Cx11_{(R1)}$ and $Cx12_{(R1)}$ are $Cx11_{(R1)}$=ZCx and $Cx12_{(R1)}$= ZCx−1. Also as for the shift quantities Sx and Sy, the combination of $Sx11_{(R1)}$=ZSx and $Sx12_{(R1)}$=ZSx−1, and the combination of $Sy11_{(R1)}$=ZSy and $Sy12_{(R1)}$=ZSy−1 are switched.

As shown in FIG. 16, at the time point of a first period of the Nth line in the main scanning direction, a difference arises between the processing unit area of the averaging processing and the processing unit area of the screen processing. However, the difference in the main scanning direction can be offset by switching the period at the next second period from the processing period $Cx11_{(R1)}$ to the processing period $Cx12_{(R1)}$. Moreover, also in the sub scanning direction, a difference arises between the processing unit areas of the averaging processing and the screen processing, but the difference in the sub scanning direction is offset at a (N+2Sy−1)th line after passing through two period into the sub scanning direction by switching the shift quantity Sy in the sub scanning direction to the shift quantity Sy−1.

That is, although the processing unit areas in the averaging processing and the screen processing do not accord with each other from the local point of view of for one period, the processing unit areas do not greatly shift from each other and almost accord with each other at the time of taking a broad view as the whole image.

The averaging processing based on the above conditions is realized by the following configuration.

Figure 17:
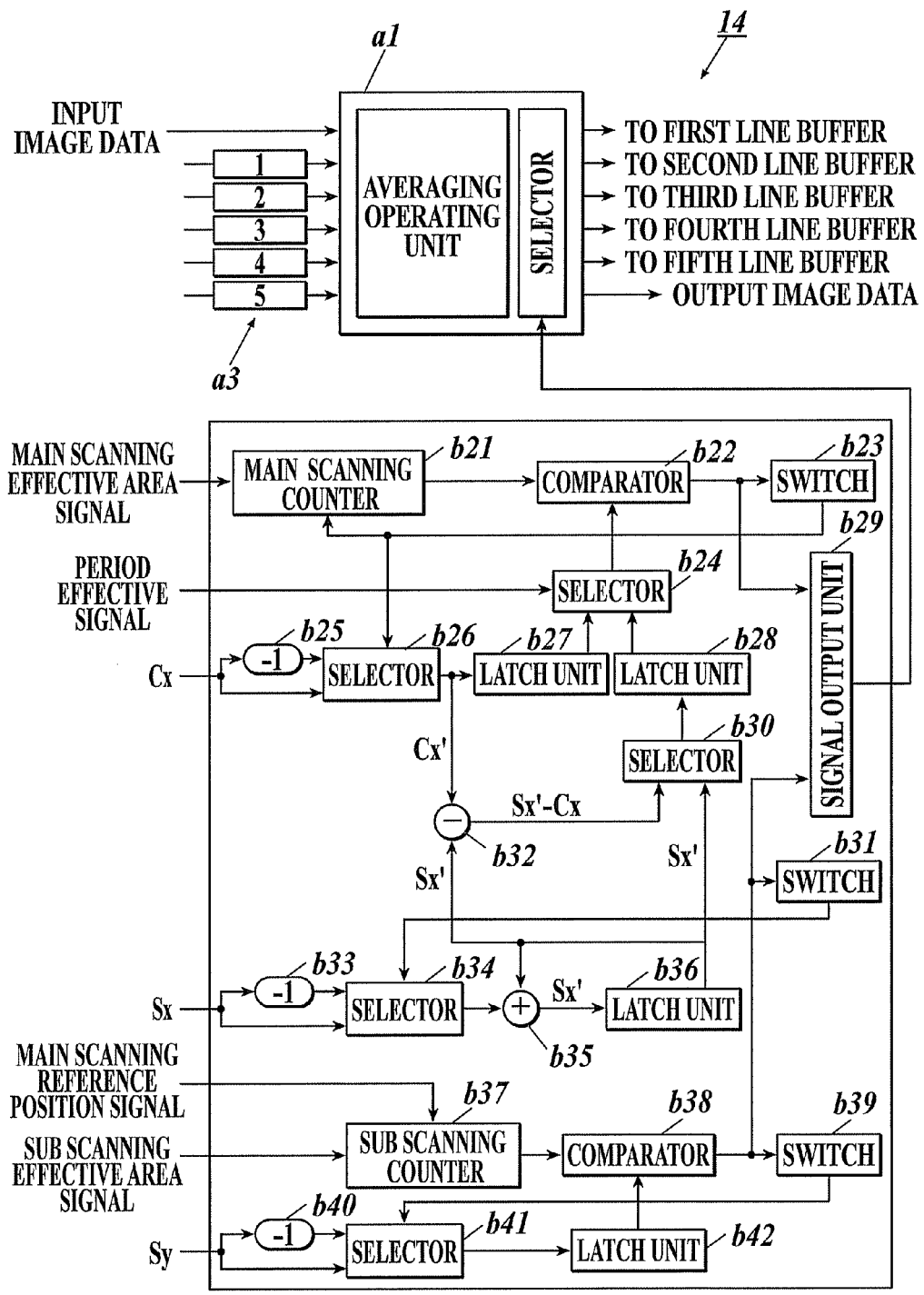
FIG. 17 is a diagram showing the configuration of an averaging processing unit according to the second embodiment.

FIG. 17 shows the configuration of each of the averaging processing units 14 in the second embodiment. Incidentally, because the MFP of the second embodiment differs from the MFP 100 of the first embodiment only in the configuration of each of the averaging processing units 14, the same components are denoted by the same signs and their descriptions are omitted. Only the configuration of each of the averaging processing units 14 is described.

As shown in FIG. 17, because the averaging processing unit 14 is equipped with the operation unit a1 and the line buffer memories a3 similarly to the first embodiment, the operation unit and the line buffer memories are denoted by the same signs as those of the first embodiment. That is, the operation unit a1 switches the outputs of an original pixel value and an average value on the basis of an input averaging effective signal. In the second embodiment, the configuration of a signal generating unit b2, generating the averaging effective signal, differs from the signal generating unit a2 of the first embodiment.

The signal generating unit b2 generates and outputs an averaging effective signal according to input shift signals Cx, Sx, and Sy, a main scanning effective area signal, a sub scanning effective area signal, and a period effective signal. The input conditions of these signals are the same as those of the first embodiment.

It is supposed here that fractional parts are carried up at the time of obtaining the integer values ZCx, ZSx, and ZSy of the shift quantities $Cx11_{(R1)}$, $Sx11_{(R1)}$, and $Sy11_{(R1)}$, and an example of adopting the corresponding processing periods ZCx−1, ZSx−1, and ZSy−1 is described. The shift signals Cx, Sx, and Sy shown in the following description and FIG. 17 correspond to $Cx11_{(R1)}$ (=ZCx), $Sx11_{(R1)}$ (=ZSx), and $Sy11_{(R1)}$ (=ZSy), respectively. Moreover, Cx−1, Sx−1, and Sy−1 correspond to $Cx12_{(R1)}$ (=ZCx−1), $Sx12_{(R1)}$ (=ZSx−1), $Sy12_{(R1)}$ (=ZSy−1), respectively.

In the signal generating unit b2, a main scanning counter b21 repeatedly counts the numbers of from 1 to Cx, and outputs the counted number to a comparator b22. Incidentally, the counting is performed only when the main scanning effective area signal is its on-state, and the main scanning counter b21 resets its counted value when a switching signal is input from a switching unit b23. On the other hand, when a shift signal Cx is input, the shift signal Cx is output to a selector b26, and a shift signal Cx−1, which is the signal generated by subtracting one from a shift signal Cx with a subtracter b25, is output to a selector b25.

The switching unit b23 generates a switching signal, the state of which is changed between the on-state and the off-state every output of an on-signal from the comparator b22, and outputs the generated switching signal to the selector b26 and the main scanning counter b21.

The selector b26 selects either of the shift signals Cx and Cx−1 on the basis of the switching signal input from the switching unit b23, and outputs the selected shift signal to a latch unit b27. To put it concretely, the selector b26 selects the shift signal Cx when the switching signal is the on-state, and selects the shift signal Cx−1 when the switching signal is the off-state. After the timing of the shift signal Cx or Cx−1 is adjusted by the latch unit b27, the shift signal Cx or Cx−1 is output to a selector b24.

When the shift signal Sx is input, the shift signal Sx is output to a selector b34, and a shift signal, which has a shift quantity Sx−1 produced by subtracting one from the sift quantity Sx by a subtracter b33, is output to the selector b34. The selector b34 selects either of the shift signals Sx or Sx−1 on the basis of a switching signal input from a switching unit b31, and outputs the selected shift signal to an adder b35. To put it concretely, the selector b34 selects the shift signal Sx when the switching signal is the on-state, and selects the shift signal Sx−1 when the switching signal is the off-state.

The adder b35 adds the shift signal output at the position just before the shift signal Sx or Sx−1, input from the selector b34, by the shift quantity Sy in the main scanning line to the shift signal Sx or Sx−1. The added shift signal is denoted by Sx'. The shift signal Sx' is output to a selector b30, and receives the timing adjustment thereof by a latch unit b36. After that, the shift signal Sx' is output to a subtracter b32 and the adder b35.

The subtracter b32 calculates the difference Sx'−Cx' between the input shift signals Sx' and Cx', and outputs the calculated difference Sx'−Cx' to the selector b30. The selector b30 selects the shift signal Sx' when the difference Sx'−Cx'<0, and selects the difference Sx'−Cx' when the difference Sx'−Cx'>0. The selector b30 outputs the selected signal to a latch unit b28. The latch unit b28 performs the timing adjustment of the input signal, and after that outputs the shift signal Sx' or Sx'−Cx' to the selector b24.

The selector b24 selects the shift signal Sx' (or Sx'−Cx') between the input shift signals Cx' and Sx' (or Sx'−Cx') when the period effective signal is the on-state, and outputs the selected shift signal Sx' (or Sx'−Cx') to the comparator b22. Moreover, the selector 24 selects the shift signal Cx' when the period effective signal is the off-state, and outputs the selected shift signal Cx' to the comparator b22.

The comparator b22 generates an on-signal and outputs the generated on-signal to a signal output unit b29 when the counted number of the main scanning and the input shift signal Cx' or Sx' (or Sx'−Cx') accord with each other, and generates an off-signal and outputs the generated off-signal to the signal output unit b29 when the counted number of the main scanning and the input shift signal Cx' or Sx' (or Sx'−Cx') do not accord with each other.

On the other hand, a sub scanning counter b37 repeatedly counts the numbers of from 1 to Sy while the sub scanning effective area signal is in the on-state, and outputs the counted number to a comparator b38. Incidentally, when a switching signal is input from a switching unit b39, the sub scanning counter b37 resets the counted values. Moreover, the sub scanning counter b37 detects a shift into the sub scanning direction on the basis of the main scanning reference position signal to perform the counting.

When a shift signal Sy is input, the shift signal Sy is output to a selector b41, and a shift signal the shift quantity of which is Sy−1 obtained by subtracting one in a subtracter b40 is output to the selector b41. The switching unit b39 generates a switching signal the state of which is switched between it on-state and its off-state every output of an on-signal from the comparator b38, and outputs the switching signal to the selector b41 and the sub scanning counter b37.

The selector b41 selects either shift signal Sy or Sy−1 on the basis of the switching signal, and outputs the selected shift signal to the comparator b38. To put it concretely, the selector b41 selects the shift signal Sy when the switching signal is the on-state, and selects the shift signal Sy−1 when the switching signal is the off-state. The comparator b38 compares the counted number in the sub scanning counter b37 and the input shift signal Sy (or Sy−1), and outputs an on-signal to the signal output unit b29 and the switching unit b39 when the counted number and the shift signal Sy (or Sy−1) accord with each other. Moreover, when the counted number and the shift signal Sy (or Sy−1) do not accord with each other, the comparator b38 outputs an off-signal.

A signal output unit b28 is configured as an AND circuit, and generates an averaging effective signal, which is in its on-state when both of the signals input from the comparator b22 and a comparator b42 are on-signals and is in its off-state not in the case where both the input signals are the on-signals. The signal output unit b28 outputs the generated averaging effective signal to the operation unit a1.

Figure 18:
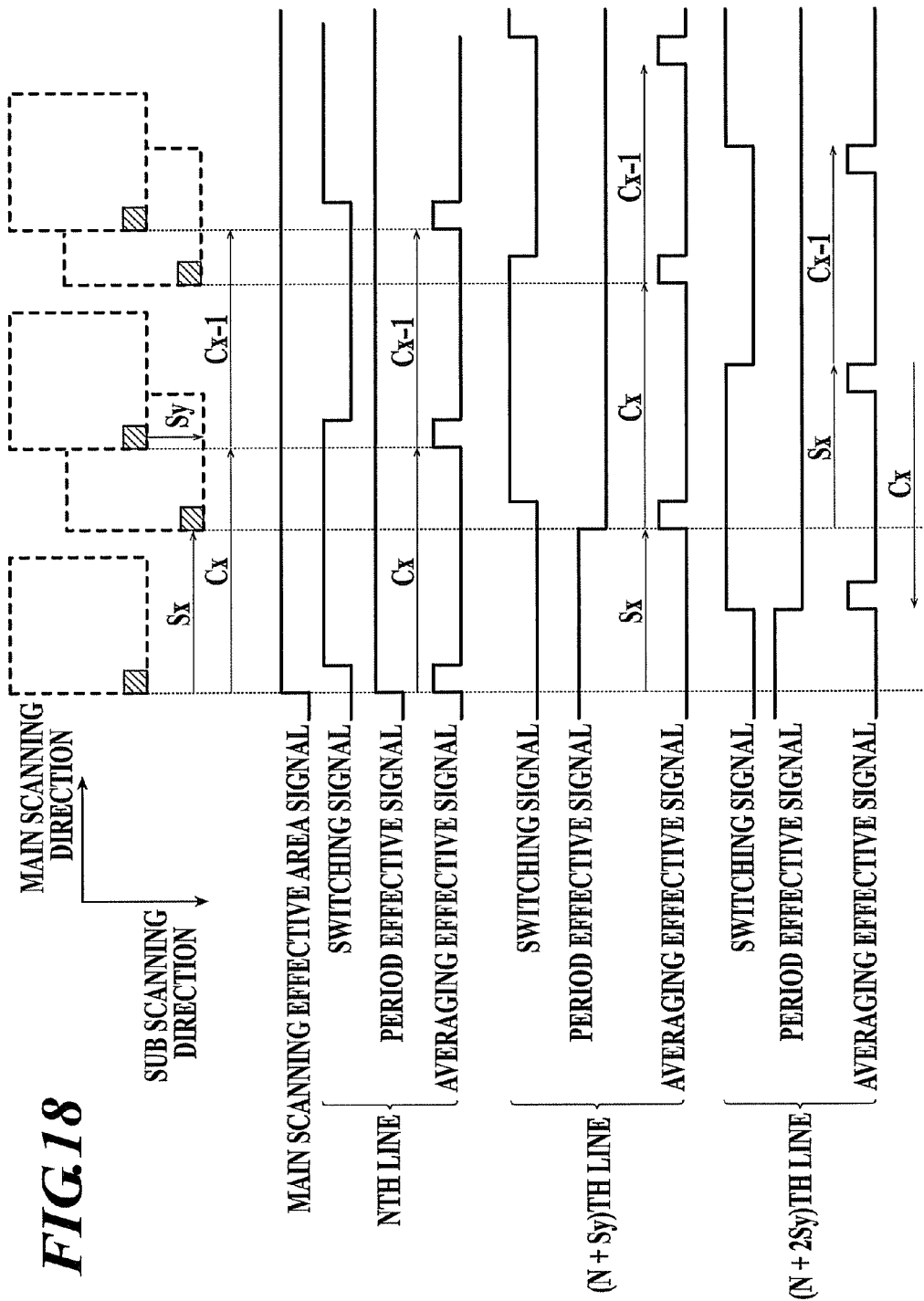
FIG. 18 is a diagram showing a time chart of averaging effective signals generated in a control unit of FIG. 17.

The time chart of the averaging effective signal generated by the aforesaid signal generating unit b2 is shown in FIG. 18. A description is sequentially given here from the processing of the Nth line in which the first pixel is set as the starting pixel of the averaging processing in the main scanning direction.

As shown in FIG. 18, at the Nth line, because the switching signal is in its off-state at the starting pixel, the selector b26 selects the shift signal Cx. On the other hand, if the averaging effective signal is made to be in its on-state at the starting pixel, then the switching signal is switched to its off-state. In the off-state of the switching signal, the selector b26 selects the shift signal Cx−1. Because the comparator b22 outputs its on-signal when the counted number accords with the shift signal Cx and then the shift signal Cx−1, the averaging effective signal is made to be its on-state for a period of from the shift signal Cx to the shift signal Cx−1.

At the Nth line, the switching signal output from the switching unit b39 is in its on-state, and the selector b41 selects the shift signal Sy. Consequently, when the main scanning of the Nth line is completed, the comparator b41 outputs the on-signal to the signal output unit b29 when the counted number of the sub scanning becomes the shift quantity Sy. Consequently, it is the (N+Sy)th line, which is shifted from the Nth line by the shift quantity Sy, when the averaging effective signal next becomes the on-state. Moreover, when the shift of the shifted quantity Sy is performed, the switching signal from the switching unit b39 switches from the on-state to the off-state. Consequently, the selector b41 selects the shift signal Sy−1. That is, it is the (N+2Sy−1)th line when the averaging effective signal becomes the on-state next to the (N+Sy)th line.

At the (N+Sy)th line, the switching signal output from the switching unit b31 is the on-state, and the selector b34 selects the shift signal Sx. Consequently, at the (N+Sy)th line, the processing period of the shift quantities Cx and Cx−1 is repeated from a position shifted by the shift quantity Sx from the starting pixel in the main scanning direction. At the time of shifting to the (N+2Sy−1)th line, the switching signal from the switching unit b31 is switched from the on-state to the off-state by receiving the on-signal from the comparator b38, and consequently the selector b34 selects the shift signal Sx−1. As a result, at the (N+2Sy−1)th line, the processing periods Cx and Cx−1 are repeated from the position shifted from the starting pixel by (Sx+Sx−1−Cx).

As described above, in the main scanning direction, the periods Cx and Cx−1 are alternately switched, and in the sub scanning direction, the periods Sy and Sy−1 are alternately switched. Moreover, also as to the shift period Sx, which is the shift period of the initial position, the periods Sx and Sx−1 are alternately switched every shift in the sub scanning direction. As a result, the difference between the processing periods in the main scanning direction and in the sub scanning direction in the screen processing can be offset by passing the periods for R times.

Incidentally, it is supposed that the fractional parts of the shift quantities Cx11, Sx11, and Sy11 are omitted when the integer values ZCx, ZSx, and ZSy of the shift quantities Cx11, Sx11, and Sy11. If processing periods ZCx+1, ZSx+1, and ZSy+1 are adopted as corresponding processing periods, it is sufficient to replace the subtracters b25, b33, and b40 with the adders that severally add one to input shift signals Cx11 (=ZCx), Sx11 (=ZSx), and Sy11 (=ZSy) in FIG. 17.

Moreover, although the above description has been given to the case where differences arise in the processing unit area in the main scanning direction and in the sub scanning direction, a difference sometimes arises any one of the main scanning direction and the sub scanning direction. In this case, there may be adopted a configuration in which a control signal (hereinafter referred to as an invalidation signal) invalidating the inputs from the subtracters b25, b33, and b40 in the selectors b26, b34, and b41 is input from the signal control unit and the selectors b26, b34, and b41 are forced not to select the processing periods Cx−1, Sx−1, and Sy−1 but to select the shift signals Cx, Sx, and Sy. Because the control signal can individually be input into the selectors b26, b34, and b41, the invalidation signal is input only to the selector b41 if the processing period is switched only in the main scanning direction. Moreover, if the processing period only in the sub scanning direction is switched, the invalidation signal is input into the selectors b26 and b34. Thereby, the processing period can be switched separately in the main scanning direction and in the sub scanning direction.

As described above, according to the second embodiment, if the processing periods of the averaging processing and the screen processing become different from each other owing to the intervening of a resolution conversion, the integer values ZCx, ZSx, and ZSy of the solutions of dividing the processing periods $Cx2_{(R2)}$, $Sx2_{(R2)}$, and $Sy2_{(R2)}$ in the screen processing by R are obtained. Then, the processing period Cx1 in the main scanning direction is made to the processing periods $Cx11_{(R1)}$=ZCx and $Cx12_{(R1)}$=ZCx−1 (or ZCx+1), and the averaging processing is performed while the processing periods $Cx11_{(R1)}$ and the $Cx12_{(R1)}$ are switched. Moreover, as for the processing periods Sx1 and Sy1, if their switching is necessary, the processing periods Sx1 and Sx2 are similarly made to the processing periods Sx11=ZSx, Sx12=ZSx−1 (or ZSx+1), Sy11=ZSy, and Sy12=ZSy−1 (or ZSy+1), and the processing periods Sx11, Sx12, Sy11, and Sy12 are switched. Thereby, after the processing periods for R periods have passed, the differences between the processing periods of the averaging processing and the screen processing in the main scanning direction and in the sub scanning direction can be offset. Consequently, the processing periods locally do not accord with each other, but the processing periods can almost accord with each other in the whole image, and the occurrence of moiré owing to the discordance of processing periods and the loss of sharpness of an image can be suppressed.

According to an aspect of a preferable embodiment of the present invention, there is provided an image processing apparatus, comprising:

an averaging processing unit to periodically execute an averaging processing of applying an averaging pattern to a processing target image and replacing each pixel value in a pixel group corresponding to the averaging pattern with an average value of the pixel values;

a resolution converting unit to perform a resolution converting processing to the processing target image, the resolution converting processing converting a resolution R1 of the processing target image into a resolution R2 (R1<R2);

a screen processing unit to perform a screen processing to a processed image which has been processed by the averaging processing, the screen processing applying a screen pattern to the processed image at the same or almost the same period as that of the averaging processing; and a control unit to control the averaging processing unit, the resolution converting unit and the screen processing unit such that the averaging processing, the resolution converting processing and the screen processing are performed in this order to the processing target image.

Preferably, in the image processing apparatus, the averaging pattern specifies averaging target pixels and includes weighting coefficients set correspondingly to the averaging target pixels, and the averaging processing unit respectively multiplies each of the pixel values of the pixel group corresponding to the averaging pattern by the weighting coefficients, obtains an average value by dividing a total sum of the respective multiplied values by a total sum of the weighting coefficients, and replaces the respective pixel values of the pixel group with the average value.

According to the image processing apparatus, the resolution converting processing heightening the resolution is performed after the averaging processing. Because the data quantity of the processing target image increases by the heightening of the resolution, the memory necessary for holding the data, the operation circuit, and the like, also expands. However, according to the present invention, the image of the lower resolution R1 before the conversion is the processing target at the time of the averaging processing. Consequently, the memory, the operation circuit, and the like, which are used for the averaging processing, can deal with the averaging processing by the scale according to the processing target image of the lower resolution R1. That is, the expansion of the circuit size can be suppressed, and the increase of cost can be avoided.

Preferably, in the image processing apparatus, the weighting coefficients set to the averaging pattern, and a shape or a size of the averaging pattern can be set to each color material to be used for an output of the processed image to which the screen processing is performed.

According to the image processing apparatus, the optimum averaging pattern can be set according to the color material.

Preferably, in the image processing apparatus, when an image discrimination signal indicating an attribute of an image discriminated to each of the pixels of the processing target image is input, the averaging processing unit discriminates non-averaging target pixels on the basis of the image discrimination signal, and excludes the non-averaging target pixels from targets of the averaging processing.

According to the image processing apparatus, a character, a line drawing, and the like, can be excluded from the processing target of averaging by discriminating the pixels having the attributes, such as the character and the line drawing, which are required to be sharp, as the non-averaging target pixels.

Preferably, the image processing apparatus further comprising:

a signal generating unit obtaining an integer value Z of a solution of dividing the processing period of the screen processing by a magnification R (R=R2/R1) of the resolution conversion when the processing periods of the averaging processing and the screen processing are almost the same, the signal generating unit setting a combination of the integer values Z and Z+1 or a combination of the integer values Z and Z−1 as the processing period of the averaging processing, and the signal generating unit making the processing periods of the averaging processing and the screen processing for R periods accord with each other by switching the processing periods Z and Z+1 or by switching the processing periods Z and Z−1.

Preferably, in the image processing apparatus, the processing periods are the processing periods of the processing target image in the main scanning direction and in the sub scanning direction, and a shift quantity of a starting position of the averaging processing in the main scanning direction.

According to the image processing apparatus, as the result of the intervening of the resolution converting processing, even if a local difference between processing periods in the averaging processing and in the screen processing arises, the difference can be offset by passing the processing periods for the R periods. Consequently, the processing periods of the averaging processing and the screen processing can be made to be almost the same as the whole image. Thereby, the occurrence of moiré owing to the discordance of the processing periods and the loss of the sharpness can be avoided.

Preferably, in the image processing apparatus, the magnification R is two; and the signal generating unit makes the processing periods of the averaging processing and the screen processing for two periods accord with each other by alternately switching the processing period of the averaging processing between the period Z and the period Z+1, or between the period Z and the period Z−1.

According to the image processing apparatus, as the result of the intervening of the resolution converting processing of the magnification being twice, even if a local difference between the processing periods of the averaging processing and the screen processing arises, the periods Z and Z+1 (or Z−1) are alternately switched, and after the processing periods for two periods the difference can be offset. Consequently, as the whole image, the processing periods of the averaging processing and the screen processing can be made to be almost the same, and the occurrence of the moiré owing to the discordance of the processing periods and the loss of the sharpness can be avoided.

According to another aspect of the preferable embodiment of the present invention, there is provided an image processing method, comprising the steps of:

periodically executing an averaging processing of applying an averaging pattern to a processing target image and replacing each pixel value in a pixel group corresponding to the averaging pattern with an average value of the pixel values;

performing a resolution converting processing to the processing target image, the resolution converting processing converting a resolution R1 of the processing target image into a resolution R2 (R1<R2);

performing a screen processing to a processed image which has been processed by the averaging processing, the screen processing applying a screen pattern to the processed image at the same or almost the same period as that of the averaging processing; and performing a controlling the averaging processing, the resolution converting processing and the screen processing such that the averaging processing, the resolution converting processing and the screen processing are performed in this order to the processing target image.

Preferably, in the image processing method, the averaging pattern specifies averaging target pixels and includes weighting coefficients set correspondingly to the averaging target pixels, and the step of periodically executing the averaging processing respectively multiplies the pixel values of the pixel group corresponding to the averaging pattern by the weighting coefficients, obtains an average value by dividing a total sum of the respective multiplied values by a total sum of the weighting coefficients, and replaces the respective pixel values of the pixel group with the average value.

According to the image processing method, the resolution converting processing heightening the resolution is performed after the averaging processing. Because the data quantity of the processing target image increases by the heightening of the resolution, the memory necessary for holding the data, the operation circuit, and the like, also expands. However, according to the present invention, the image of the lower resolution R1 before the conversion is the processing target at the time of the averaging processing. Consequently, the memory, the operation circuit, and the like, which are used for the averaging processing, can deal with the averaging processing by the scale according to the processing target image of the lower resolution R1. That is, the expansion of the circuit size can be suppressed, and the increase of cost can be avoided.

Preferably, in the image processing method,
the weighting coefficients set to the averaging pattern, and a shape or a size of the averaging pattern can be set to each color material to be used for an output of the processed image to which the screen processing is performed.

According to the image processing method, the optimum averaging pattern can be set according to the color material.

Preferably, in the image processing method,
when an image discrimination signal indicating an attribute of an image discriminated to each of the pixels of the processing target image is input, the step of periodically executing the averaging processing discriminates non-averaging target pixels on the basis of the image discrimination signal, and excludes the non-averaging target pixels from targets of the averaging processing.

According to the image processing method, the pixels having the attributes, such as a character and a line drawing, which is required to have sharpness, are discriminated as the non-averaging target pixels, and thereby the character, the line drawing, and the like, can be excluded from the processing target of averaging.

Preferably, the image processing method further comprising:
the step of obtaining an integer value Z of a solution of dividing the processing period of the screen processing by a magnification R (R=R2/R1) of the resolution conversion when the processing periods of the averaging processing and the screen processing are almost the same, the step setting a combination of the integer values Z and Z+1 or a combination of the integer values Z and Z−1 as the processing period of the averaging processing, and the step making the processing periods of the averaging processing and the screen processing for R periods accord with each other by switching the processing periods Z and Z+1 or by switching the processing periods Z and Z−1.

Preferably, in the image processing method,
the processing periods are the processing periods of the processing target image in the main scanning direction and in the sub scanning direction, and a shift quantity of a starting position of the averaging processing in the main scanning direction.

According to the image processing method, as the result of the intervening of the resolution converting processing, even if a local difference between processing periods in the averaging processing and in the screen processing arises, the difference can be offset by passing the processing periods for the R periods. Consequently, the processing periods of the averaging processing and the screen processing can be made to be almost the same as the whole image. Thereby, the occurrence of moiré owing to the discordance of the processing periods and the loss of the sharpness can be avoided.

Preferably, in the image processing method, the magnification R is two; and
the step of obtaining the integer value Z makes the processing periods of the averaging processing and the screen processing for two periods accord with each other by alternately switching the processing period of the averaging processing between the period Z and the period Z+1, or between the period Z and the period Z−1.

According to the image processing method, as the result of the intervening of the resolution converting processing of the magnification being twice, even if a local difference between the processing periods of the averaging processing and the screen processing arises, the periods Z and Z+1 (or Z−1) are alternately switched, and after the processing periods for two periods the difference can be offset. Consequently, as the whole image, the processing periods of the averaging processing and the screen processing can be made to be almost the same, and the occurrence of the moiré owing to the discordance of the processing periods and the loss of the sharpness can be avoided.

The present US patent application claims the benefit of the priority based on Paris Convention of Japanese Patent Application No. 2006-273263, filed in Japanese Patent Office on Oct. 4, 2006, which is hereby incorporated by reference herein in its entirety and constitutes the basis of the amendments of mistranslations.

What is claimed is:

1. A non-transitory computer-readable medium including computer-executable instructions that, when executed by a computer, cause the computer to perform:
periodically executing an averaging processing of applying an averaging pattern to a processing target image and replacing each pixel value in a pixel group corresponding to the averaging pattern with an average value of the pixel values;
performing a resolution converting processing to the processing target image, the resolution converting processing converting a resolution R1 of the processing target image into a resolution R2 (R1<R2);
performing a screen processing to a processed image which has been processed by the averaging processing, the screen processing applying a screen pattern to the processed image at the same or almost the same period as that of the averaging processing;
controlling the averaging processing unit, the resolution converting unit and the screen processing unit such that the averaging processing, the resolution converting processing and the screen processing are performed in this order to the processing target image;
obtaining an integer value Z of a solution of dividing the processing period of the screen processing by a magnification R (R=R2/R1) of the resolution conversion when the processing periods of the averaging processing and the screen processing are almost the same;
setting a combination of the integer values Z and Z+1 or a combination of the integer values Z and Z−1 as the processing period of the averaging processing; and
making the processing periods of the averaging processing and the screen processing for R periods accord with each other by switching the processing periods Z and Z+1 or by switching the processing periods Z and Z−1.

2. The computer-readable medium of claim 1, wherein
the averaging pattern specifies averaging target pixels and includes weighting coefficients set correspondingly to the averaging target pixels, and
the averaging processing respectively multiplies each of the pixel values of the pixel group corresponding to the averaging pattern by the weighting coefficients, obtains an average value by dividing a total sum of the respective multiplied values by a total sum of the weighting coefficients, and replaces the respective pixel values of the pixel group with the average value.

3. The computer-readable medium of claim 2, wherein
the weighting coefficients set to the averaging pattern, and a shape or a size of the averaging pattern can be set to each color material to be used for an output of the processed image to which the screen processing is performed.

4. The computer-readable medium of claim 1, wherein
when an image discrimination signal indicating an attribute of an image discriminated to each of the pixels of the processing target image is input, the averaging processing discriminates non-averaging target pixels on the basis of the image discrimination signal, and excludes the non-averaging target pixels from targets of the averaging processing.

5. The computer-readable medium of claim 1, wherein
the processing periods are the processing periods of the processing target image in the main scanning direction and in the sub scanning direction, and a shift quantity of a starting position of the averaging processing in the main scanning direction.

6. The computer-readable medium of claim 1, wherein
the magnification R is two; and
the obtaining an integer value Z makes the processing periods of the averaging processing and the screen processing for two periods accord with each other by alternately switching the processing period of the averaging processing between the period Z and the period Z+1, or between the period Z and the period Z−1.

7. An image processing method, comprising:
periodically executing an averaging processing of applying an averaging pattern to a processing target image and replacing each pixel value in a pixel group corresponding to the averaging pattern with an average value of the pixel values;
performing a resolution converting processing to the processing target image, the resolution converting processing converting a resolution R1 of the processing target image into a resolution R2 (R1<R2);
performing a screen processing to a processed image which has been processed by the averaging processing, the screen processing applying a screen pattern to the processed image at the same or almost the same period as that of the averaging processing;
performing a controlling the averaging processing, the resolution converting processing and the screen processing such that the averaging processing, the resolution converting processing and the screen processing are performed in this order to the processing target image; and
obtaining an integer value Z of a solution of dividing the processing period of the screen processing by a magnification R (R=R2/R1) of the resolution conversion when the processing periods of the averaging processing and the screen processing are almost the same, setting a combination of the integer values Z and Z+1 or a combination of the integer values Z and Z−1 as the processing period of the averaging processing, and making the processing periods of the averaging processing and the screen processing for R periods accord with each other by switching the processing periods Z and Z+1 or by switching the processing periods Z and Z−1.

8. The image processing method of claim 7, wherein
the averaging pattern specifies averaging target pixels and includes weighting coefficients set correspondingly to the averaging target pixels, and
the periodically executing the averaging processing respectively multiplies the pixel values of the pixel group corresponding to the averaging pattern by the weighting coefficients, obtains an average value by dividing a total sum of the respective multiplied values by a total sum of the weighting coefficients, and replaces the respective pixel values of the pixel group with the average value.

9. The image processing method of claim 8, wherein
the weighting coefficients set to the averaging pattern, and a shape or a size of the averaging pattern can be set to each color material to be used for an output of the processed image to which the screen processing is performed.

10. The image processing method of claim 7, wherein
when an image discrimination signal indicating an attribute of an image discriminated to each of the pixels of the processing target image is input, the periodically executing the averaging processing discriminates non-averaging target pixels on the basis of the image discrimination signal, and excludes the non-averaging target pixels from targets of the averaging processing.

11. The image processing method of claim 7, wherein
the processing periods are the processing periods of the processing target image in the main scanning direction and in the sub scanning direction, and a shift quantity of a starting position of the averaging processing in the main scanning direction.

12. The image processing method of claim 7, wherein
the magnification R is two; and
the obtaining the integer value Z makes the processing periods of the averaging processing and the screen processing for two periods accord with each other by alternately switching the processing period of the averaging processing between the period Z and the period Z+1, or between the period Z and the period Z−1.

* * * * *